US011025329B2

(12) United States Patent
Takano

(10) Patent No.: US 11,025,329 B2
(45) Date of Patent: Jun. 1, 2021

(54) COMMUNICATION APPARATUS, COMMUNICATION CONTROL METHOD, AND COMPUTER PROGRAM

(71) Applicant: Sony Corporation, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/619,991

(22) PCT Filed: May 17, 2018

(86) PCT No.: PCT/JP2018/019071
§ 371 (c)(1),
(2) Date: Dec. 6, 2019

(87) PCT Pub. No.: WO2018/230246
PCT Pub. Date: Dec. 20, 2018

(65) Prior Publication Data
US 2020/0099438 A1 Mar. 26, 2020

(30) Foreign Application Priority Data
Jun. 14, 2017 (JP) .............................. JP2017-116563

(51) Int. Cl.
H04B 7/06 (2006.01)
H04L 5/00 (2006.01)
(Continued)

(52) U.S. Cl.
CPC ......... H04B 7/0695 (2013.01); H04B 7/0626 (2013.01); H04L 5/0048 (2013.01);
(Continued)

(58) Field of Classification Search
CPC ... H04B 7/0695; H04B 7/0626; H04W 16/28; H04W 52/18; H04W 52/34; H04W 72/04; H04L 5/0048
See application file for complete search history.

(56) References Cited

U.S. PATENT DOCUMENTS 9,215,697 B2 * 12/2015 Zhang ............... H04W 72/0406
9,445,331 B2 * 9/2016 Cui ........................ H04L 5/0073
(Continued)

FOREIGN PATENT DOCUMENTS

JP 2013-530604 A 7/2013
JP 2013-534394 A 9/2013
(Continued)

OTHER PUBLICATIONS

International Search Report and Written Opinion dated Aug. 7, 2018 for PCT/JP2018/019071 filed on May 17, 2018, 9 pages including English Translation of the International Search Report.
(Continued)

Primary Examiner — James M Perez
(74) Attorney, Agent, or Firm — Xsensus LLP

(57) ABSTRACT

[Object]
Provided is a communication apparatus capable of selecting a procedure to be performed when plural procedures collide with each other.
[Solving Means]
Provided is a communication apparatus including a control unit configured to select, based on a predetermined requirement, a signal to be transmitted in a case where transmission of user data, transmission of a first reference signal for channel status acquisition, and transmission of a second reference signal for suitable beam selection from beams emitted by a base station conflict with each other.

20 Claims, 21 Drawing Sheets

(51) Int. Cl.
  *H04W 16/28* (2009.01)
  *H04W 52/18* (2009.01)
  *H04W 52/34* (2009.01)
  *H04W 72/04* (2009.01)

(52) U.S. Cl.
  CPC ........... *H04W 16/28* (2013.01); *H04W 52/18* (2013.01); *H04W 52/34* (2013.01); *H04W 72/04* (2013.01)

(56) References Cited

U.S. PATENT DOCUMENTS

| | | | | |
|---|---|---|---|---|
| 9,544,108 B2* | 1/2017 | Geirhofer | | H04L 25/0226 |
| 9,681,372 B2* | 6/2017 | Takano | | H04W 56/0015 |
| 9,893,853 B2* | 2/2018 | Yi | | H04W 4/70 |
| 9,973,983 B2* | 5/2018 | Cui | | H04W 36/0061 |
| 10,531,270 B2* | 1/2020 | Takano | | H04W 8/005 |
| 10,560,906 B2* | 2/2020 | Takaoka | | H04L 5/005 |
| 2010/0150085 A1* | 6/2010 | Ishii | | H04L 1/1877 370/329 |
| 2011/0235743 A1* | 9/2011 | Lee | | H04J 11/00 375/295 |
| 2012/0106374 A1* | 5/2012 | Gaal | | H04L 5/0048 370/252 |
| 2013/0188473 A1* | 7/2013 | Dinan | | H04W 56/001 370/216 |
| 2013/0215811 A1* | 8/2013 | Takaoka | | H04W 28/0268 370/311 |
| 2014/0044061 A1* | 2/2014 | Yue | | H04B 7/0632 370/329 |
| 2015/0092582 A1* | 4/2015 | Liao | | H04L 27/2613 370/252 |
| 2015/0256312 A1* | 9/2015 | Yi | | H04L 5/0048 370/329 |
| 2015/0358848 A1* | 12/2015 | Kim | | H04L 5/0053 370/252 |
| 2015/0358881 A1* | 12/2015 | Cui | | H04W 36/04 455/436 |
| 2015/0372792 A1* | 12/2015 | Damnjanovic | | H04L 5/0048 370/329 |
| 2016/0135121 A1* | 5/2016 | Takano | | H04W 8/005 370/336 |
| 2016/0192171 A1* | 6/2016 | Takano | | H04W 76/14 370/329 |
| 2016/0198024 A1* | 7/2016 | Yu | | H04L 69/22 370/312 |
| 2016/0218816 A1* | 7/2016 | Horiuchi | | H04B 17/318 |
| 2016/0316440 A1* | 10/2016 | Dinan | | H04B 7/2618 |
| 2016/0337097 A1* | 11/2016 | Martin | | H04L 5/0007 |
| 2016/0353339 A1* | 12/2016 | Cui | | H04W 4/02 |
| 2017/0006629 A1* | 1/2017 | Jung | | H04B 17/318 |
| 2017/0033904 A1* | 2/2017 | Stirling-Gallacher | | H04L 5/0023 |
| 2017/0245165 A1* | 8/2017 | Onggosanusi | | H04W 24/08 |
| 2017/0366981 A1* | 12/2017 | Takano | | H04B 7/0632 |
| 2018/0176949 A1* | 6/2018 | Islam | | H04B 7/0695 |
| 2018/0219662 A1* | 8/2018 | Kim | | H04L 5/0051 |
| 2018/0234278 A1* | 8/2018 | Xu | | H04L 5/005 |
| 2018/0279239 A1* | 9/2018 | Si | | H04W 76/28 |
| 2018/0310283 A1* | 10/2018 | Deenoo | | H04W 72/042 |
| 2018/0316404 A1* | 11/2018 | Xu | | H04W 24/02 |
| 2018/0323923 A1* | 11/2018 | Wang | | H04L 5/0053 |
| 2018/0337757 A1* | 11/2018 | Noh | | H04L 5/0048 |
| 2018/0352550 A1* | 12/2018 | Wilhelmsson | | H04W 72/0453 |
| 2019/0059012 A1* | 2/2019 | Nam | | H04W 24/08 |
| 2019/0141703 A1* | 5/2019 | Gupta | | H04W 72/0446 |
| 2019/0182007 A1* | 6/2019 | Liu | | H04L 5/003 |
| 2019/0200249 A1* | 6/2019 | Yoon | | H04L 5/0023 |
| 2019/0200389 A1* | 6/2019 | Li | | H04W 72/1231 |
| 2019/0207662 A1* | 7/2019 | Zhou | | H04W 72/042 |
| 2019/0230708 A1* | 7/2019 | Bai | | H04L 1/0013 |
| 2019/0238304 A1* | 8/2019 | Estevez | | H04B 17/345 |
| 2019/0239202 A1* | 8/2019 | Bhattad | | H04W 76/27 |
| 2019/0312705 A1* | 10/2019 | Takano | | H04B 7/0413 |
| 2019/0320336 A1* | 10/2019 | Takano | | H04W 24/10 |
| 2019/0320355 A1* | 10/2019 | Da Silva | | H04W 72/046 |
| 2019/0357264 A1* | 11/2019 | Yi | | H04L 5/001 |
| 2020/0037255 A1* | 1/2020 | Liu | | H04W 52/325 |
| 2020/0067615 A1* | 2/2020 | Ghanbarinejad | | H04B 17/309 |
| 2020/0068463 A1* | 2/2020 | Da Silva | | H04L 1/0026 |
| 2020/0092705 A1* | 3/2020 | Takano | | H04W 72/0486 |
| 2020/0099438 A1* | 3/2020 | Takano | | H04W 52/34 |
| 2020/0146049 A1* | 5/2020 | Tang | | H04L 1/1854 |
| 2020/0196343 A1* | 6/2020 | Marinier | | H04L 1/1854 |
| 2020/0413346 A1* | 12/2020 | Dinan | | H04L 27/18 |

FOREIGN PATENT DOCUMENTS

| | | |
|---|---|---|
| JP | 2016-129407 A | 7/2016 |
| WO | 2016121252 A1 | 8/2016 |

OTHER PUBLICATIONS

Samsung, "Beam measurement and reporting," 3GPP TSG RAN WG1 Meeting No. 88bis, R1-1705344, Spokane, USA, Apr. 3-7, 2017, 5 pages.

LG Electronics: "On CSI-RS design for beam management", 3GPP Draft; R1-1707612 CSI_RS_BM, 3rd Generation Partnership Project (3GPP), Mobile Competence Centre; 650, Route Des Lucioles ; F-06921 Sophia-Antipolis Cedex; France, vol. RAN WG1, No. Hangzhou; May 15, 2017-May 19, 2017 May 6, 2017 (May 6, 2017), XP051261954.

Extended European search report dated May 8, 2020, in corresponding European Patent Application No. 18816718.3.

* cited by examiner

COMMUNICATION APPARATUS, COMMUNICATION CONTROL METHOD, AND COMPUTER PROGRAM

CROSS-REFERENCE TO RELATED APPLICATIONS

The present application is based on PCT filing PCT/JP2018/019071, filed May 17, 2018, which claims priority to JP 2017-116563, filed Jun. 14, 2017, the entire contents of each are incorporated herein by reference.

TECHNICAL FIELD

The present disclosure relates to a communication apparatus, a communication control method, and a computer program.

BACKGROUND ART

In the 3GPP (Third Generation Partnership Project), various techniques for improving the capacity of cellular systems have currently been studied in order to accommodate explosively increasing traffic.

CITATION LIST

Patent Literature

[PTL 1]
WO2016/121252A

SUMMARY

Technical Problem

Electric power and a frequency or time resource transmissible in one terminal are limited. Existing cellular systems have not been satisfactorily able to meet a demand to prioritize transmission or reception of a certain procedure over other procedures.

In view of this, the present disclosure proposes novel and enhanced communication apparatus, communication control method, and computer program capable of selecting a procedure to be performed when plural procedures collide with each other.

Solution to Problem

According to the present disclosure, there is provided a communication apparatus including a control unit configured to select, based on a predetermined requirement, a signal to be transmitted in a case where transmission of user data, transmission of a first reference signal for channel status acquisition, and transmission of a second reference signal for suitable beam selection from beams emitted by a base station conflict with each other.

Further, according to the present disclosure, there is provided a communication control method including selecting, by a processor, based on a predetermined requirement, a signal to be transmitted in a case where transmission of user data, transmission of a first reference signal for channel status acquisition, and transmission of a second reference signal for suitable beam selection from beams emitted by a base station conflict with each other.

Further, according to the present disclosure, there is provided a computer program for causing a computer to execute selecting, based on a predetermined requirement, a signal to be transmitted in a case where transmission of user data, transmission of a first reference signal for channel status acquisition, and transmission of a second reference signal for suitable beam selection from beams emitted by a base station conflict with each other.

Advantageous Effect of Invention

As described above, according to the present disclosure, there can be provided the novel and enhanced communication apparatus, communication control method, and computer program capable of selecting a procedure to be performed when plural procedures collide with each other.

Note that, the above-mentioned effect is not necessarily limited, and any effect described herein or other effects that may be grasped from the present specification may be provided in addition to the above-mentioned effect or instead of the above-mentioned effect.

DESCRIPTION OF EMBODIMENT

Figure 1:
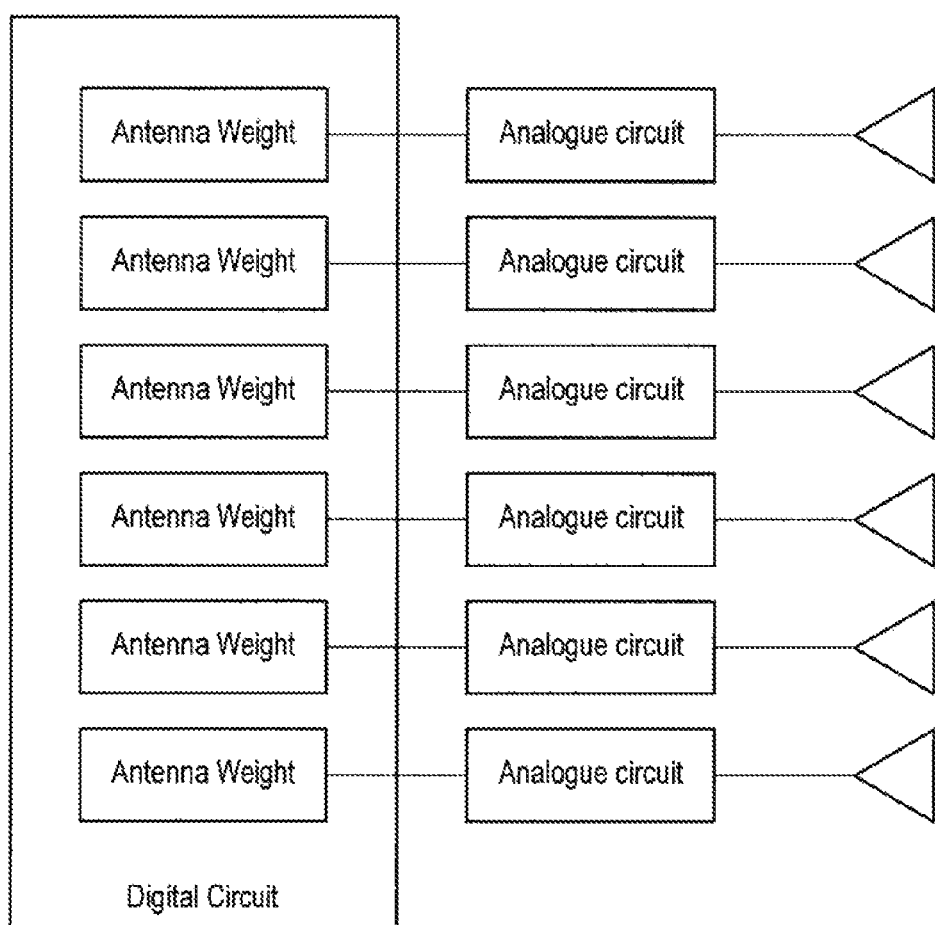
FIG. 1 is an example of a base station in a case where only digital units serve as antenna weights in beamforming.

Now, a preferred embodiment of the present disclosure is described in detail with reference to the attached drawings. Note that, in the present specification and the drawings, components having substantially the same functional configurations are denoted by the same reference signs so that overlapped description is omitted.

Note that, the following items are described in order.
1. Embodiment of Present Disclosure
1.1. Background
1.2. Configuration Example and Operation Example
2. Application Example
3. Conclusion

1. EMBODIMENT OF PRESENT DISCLOSURE

[1.1. Background]
Prior to detail description of an embodiment of the present disclosure, the background of the embodiment of the present disclosure is described.

(Codebook-Based Beam)
As described above, in the 3GPP (Third Generation Partnership Project), various techniques for improving the capacity of cellular systems have currently been studied in order to accommodate explosively increasing traffic. With regard to the future wireless communication system (5G) that has been studied in the 3GPP, it is unlikely that a mechanism that steplessly changes a beam emitted by a base station to recreate a beam following a terminal can be provided. This is because calculation cost for recreating a new beam arises. Also in FD-MIMO in 3GPP Rel 13, there has been employed a method that creates beams emitted by a base station in every direction in advance, and selects a beam required for a terminal from the beams created in advance to provide the beam. Such beams are called "codebook based beamforming." To prepare beams at every degree from 0° to 360° in the horizontal direction, 360 types of beams are required. In a case where the beams overlap each other by half, 720 beams, which is twice as many as 360, satisfactorily serve as codebook based beams in the horizontal direction. In addition, in a case where beams at every degree from 0° to 180° in the vertical direction that overlap each other by half are prepared, 360 beams can cover an angle of 180° from −90° to +90° with the horizontal direction being 0°.

(Necessity of Beam Association)
A quite large number of antenna elements, such as 256 (frequency band: 30 GHz) or 1,000 (frequency band: 70 GHz) antenna elements, can be mounted on base stations in the future. When the number of antenna elements increases in this way, very sharp beams can be created through beamforming processing using the antennas. For example, a very sharp beam having a half-value width (indicating the minimum degree at which a gain drops by 3 dB) of 1° or less can be provided from a base station to a terminal.

In order to establish communication between a base station and a terminal, it is necessary to determine what kinds of beams are to be used in the base station. In the case of downlink (DL) communication, it is necessary to determine DL beams to be provided by the base station. Further, in the case of uplink (UL) communication, it is necessary to determine UL beams that the base station is to use in reception. The UL beam, which is the latter, does not mean that the base station transmits radio waves, but means that an antenna that allows the base station to receive radio waves has directivity that is a beam.

(Beam Sweeping)
By sweeping a plurality of beam candidates from a base station (beam sweeping), a terminal observing the beam candidates can determine, of the beams that the base station may use, a beam that the terminal easily receives. Meanwhile, when the terminal transmits a UL RS (Reference Signal) and the base station receives the RS while performing beam sweeping, the base station can determine a reception beam optimal for reception of the signal from the terminal.

(Resource for Performing Beamforming)
FIG. 1 is an example of a base station in a case where only digital units serve as antenna weights in beamforming. The configuration in which only digital units serve as antenna weights in beamforming as described above is called "full-digital antenna architecture." In the case of the full-digital antenna architecture, when Tx sweeping (transmission sweeping) is performed, as many different resources as beams are required. Meanwhile, when Rx sweeping (reception sweeping) is performed, all beams can be simultaneously received in one resource. Thus, in the full-digital antenna architecture, the number of resources in reception sweeping can be small. That is, when full-digital reception sweeping is performed in the base station, a terminal only needs to transmit a UL RS (Resource Signal) corresponding to one resource, and thus consumes electric power a little. "Resource" used herein means an orthogonal resource using a frequency or time. For example, a resource block or resource element of LTE corresponds to "resource" used herein.

Figure 2:
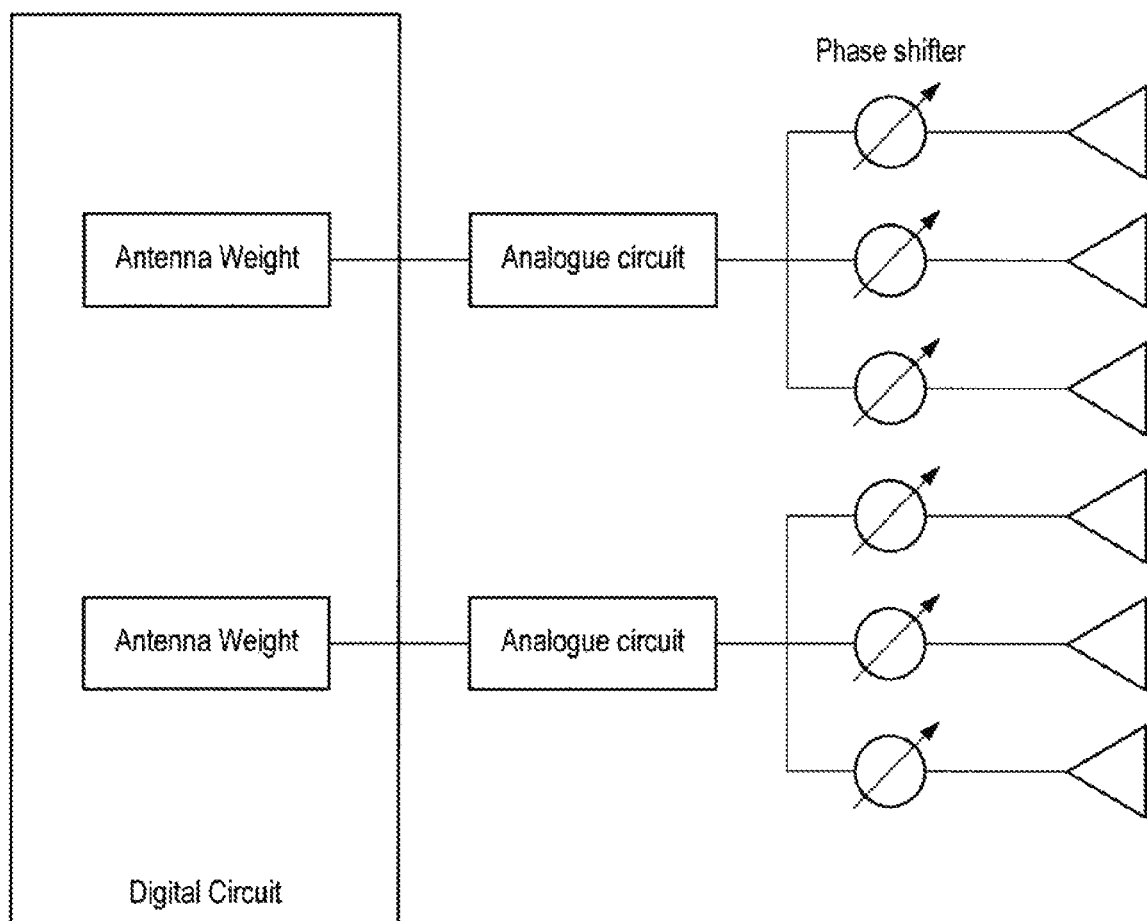
FIG. 2 is an example of the base station in a case where phase shifters of analog units are included in beamforming.

FIG. 2 is an example of the base station in a case where phase shifters of analog units are included in beamforming.

The configuration in which phase shifters of analog units are included in beamforming is called "digital-analog hybrid antenna architecture." The digital-analog hybrid antenna architecture in FIG. 2 includes the smaller number of digital units, each of which is hardware, and is thus advantageous in terms of cost. In the hybrid antenna architecture, however, the phase shifter connected to an antenna can only emit a beam in one direction, with the result that as many resources as the number of beams are required in transmission sweeping and reception sweeping. This means that, in order to perform reception sweeping by the base station, a terminal is required to transmit UL RSs to all resources corresponding to the number of beams. The terminal consequently consumes a large amount of electric power.

In light of the actual usage situation, it is assumed that the hybrid architecture illustrated in FIG. 2 is used. How to overcome a flaw of the hybrid architecture that different beams require different frequency or time resources is therefore important.

(Beam Sweeping Efficiency)

Figure 3:
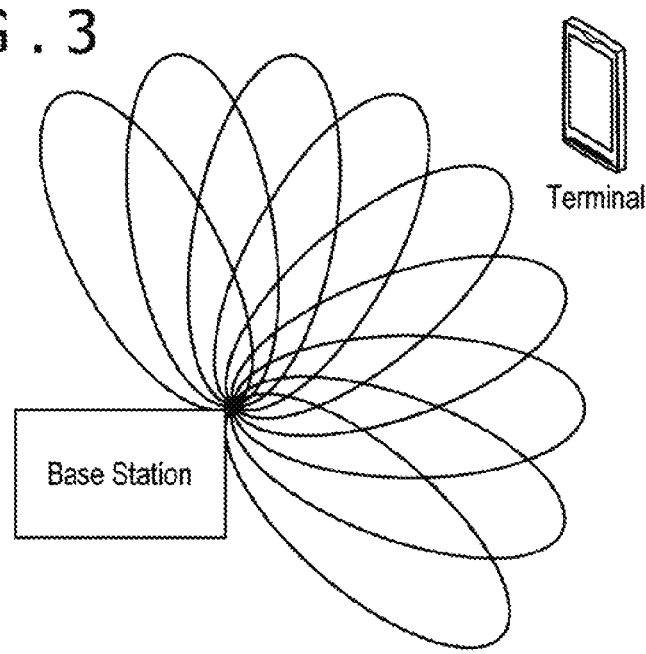
FIG. 3 is an explanatory diagram illustrating an example of beam sweeping using rough beams.
Figure 4:
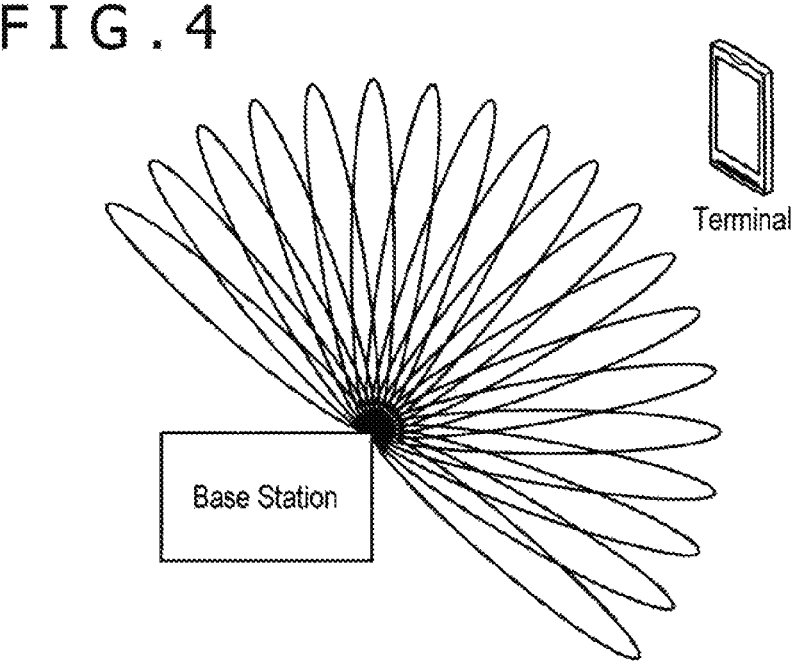
FIG. 4 is an explanatory diagram illustrating an example of beam sweeping using accurate beams.
Figure 5:
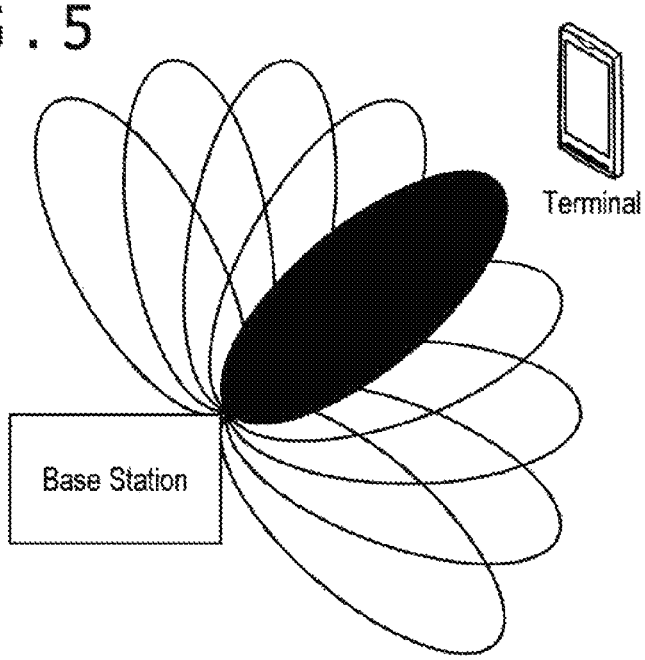
FIG. 5 is an explanatory diagram illustrating an example of a rough beam.
Figure 6:
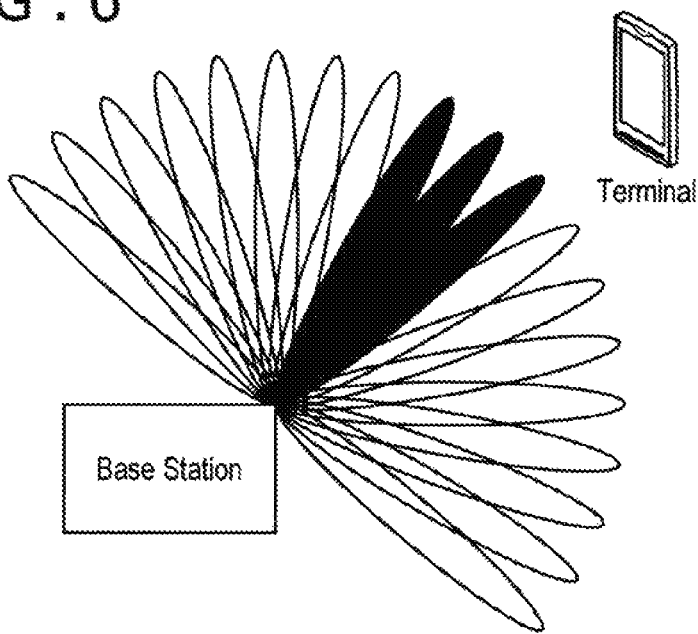
FIG. 6 is an explanatory diagram illustrating an example of rough beam generation including bundling accurate beams.

If beams at every degree from 0° to 360° in the horizontal direction are prepared and beam sweeping is performed with the use of 360 resources to evaluate the beam one by one, the processing takes long time, the number of required resources is large, and a terminal consumes a large amount of electric power. The following technology is accordingly conceivable: a base station creates rough beams at every 10°, finds an optimal beam from the beams having a resolution of 10° by using 36 resources, and thereafter performs beam sweeping using accurate beams at every degree in the range of 10°, to thereby find an optimal beam. In this case, the base station can determine an optimal beam by using 36+10=46 resources, and hence the number of resources can be greatly reduced from 360 to 46. FIG. 3 is an explanatory diagram illustrating an example of beam sweeping using rough beams. Further, FIG. 4 is an explanatory diagram illustrating an example of beam sweeping using accurate beams. The base station may bundle plural accurate beams to use the accurate beams simultaneously, thereby treating the accurate beams as a rough beam. In that case, for example, plural (for example, three) adjacent accurate beams are simultaneously used as a rough beam. The base station may provide a bundle of three accurate beams as illustrated in FIG. 6 to create a rough beam illustrated in FIG. 5. The three beams in FIG. 6 that are transmitted at the same time and the same frequency can achieve a rough beam similar to the one in FIG. 5.

(Beam Sweeping from Plural Base Stations)

Figure 7:
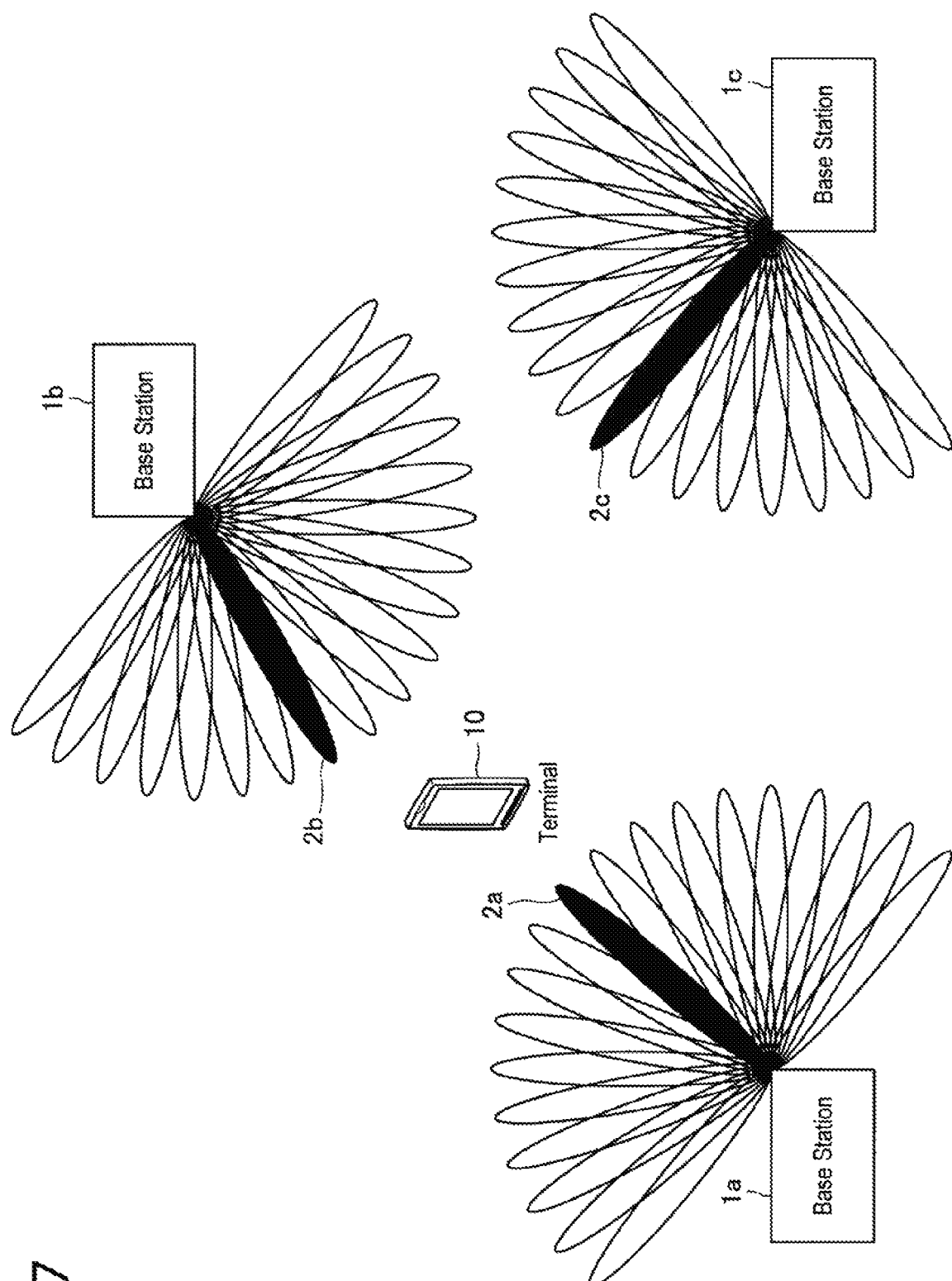
FIG. 7 is an explanatory diagram illustrating an example of a case where there are a plurality of base stations around a terminal.

In a case where there are plural base stations around a terminal, it is necessary to determine transmission beams and reception beams of the plural base stations for the terminal. FIG. 7 is an explanatory diagram illustrating an example of a case where there are plural base stations around a terminal. In the example illustrated in FIG. 7, an optimal beam for a terminal 10 is a beam 2a of a base station 1a, a beam 2b of a base station 1b, and a beam 2c of a base station 1c. As a method of determining an optimal beam, the following method is conceivable: of the plural base stations 1a to 1c, a base station closest to the terminal 10 or a main base station eventually determines an optimal beam on the basis of information from the terminal 10, and instructs other base stations. In this case, a certain base station is required to determine transmission beams and reception beams of plural base stations, and hence a burden on the terminal increases.

(Channel Reciprocity)

"Channel reciprocity" means that a UL channel and a DL channel between a base station and a terminal are the same. In TDD (Time Division Duplex) systems, since the same frequency band is used for ULs and DLs, channel reciprocity of ULs and DLs is basically held. It is, however, necessary to perform the operation of calibration to make the base station and analog units of the terminal have the same TX/RX characteristics so that reciprocity is held in both channels to the analog units of the terminal and space.

With this channel reciprocity held, when the terminal selects a DL beam from the base station and notifies the number of the beam to the base station, a UL beam that the base station is to use can be determined without the operation of reception sweeping. A combination of rough beams and accurate beams, which is described in the (Beam Sweeping Efficiency) section above, is made as follows.

(DL Beam Sweeping Process)

Figure 8:
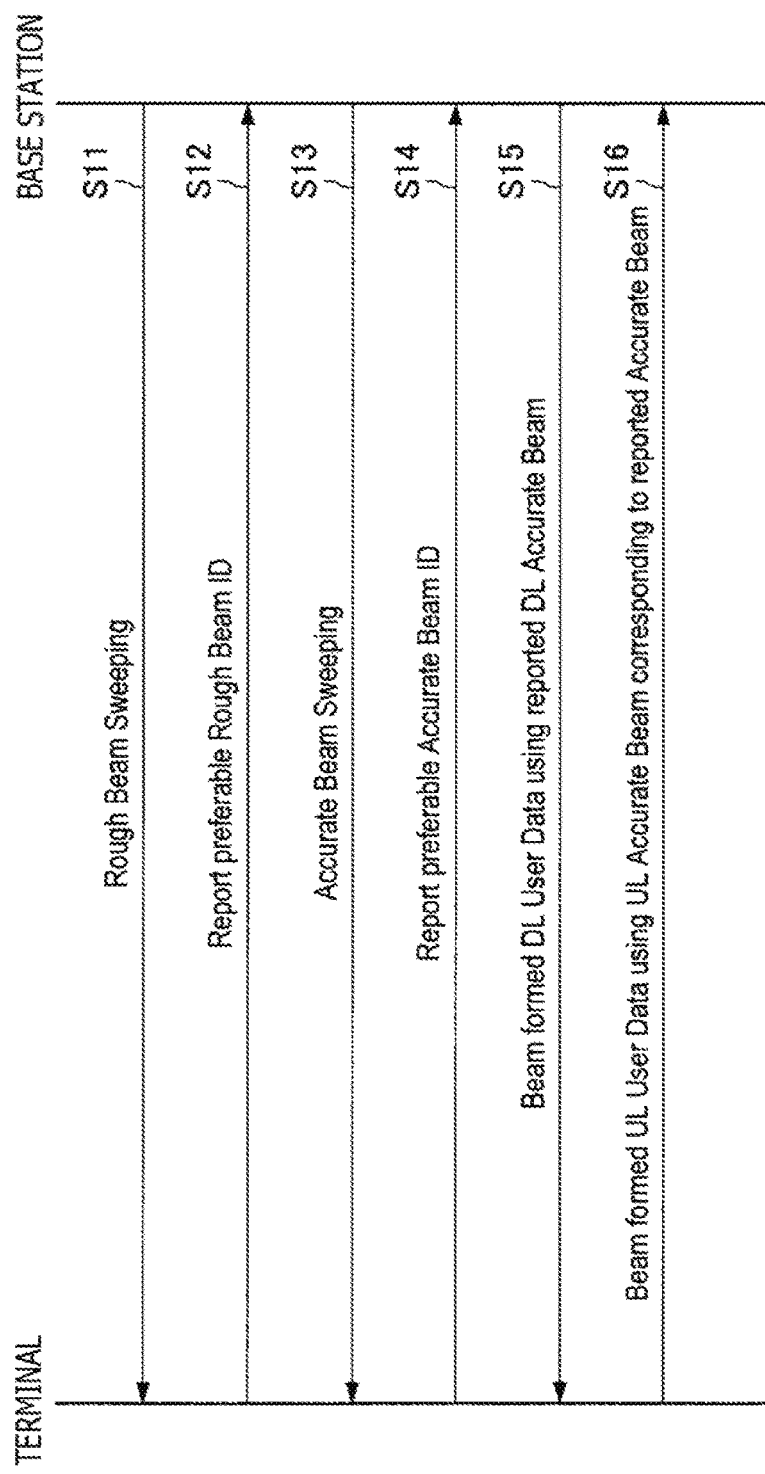
FIG. 8 is an explanatory diagram illustrating an example of a DL beam sweeping process by the base station and the terminal.

FIG. 8 is an explanatory diagram illustrating an example of a DL beam sweeping process by the base station and the terminal. First, the base station performs transmission sweeping using a rough beam on the terminal (Step S11). This transmission sweeping is performed with a sweeping pattern unique to the base station. In other words, transmission sweeping is base station-specific or cell specific.

The terminal reports the number of a rough beam desired for the terminal in question to the base station (Step S12). The terminal determines the desired rough beam on the basis of whether a beam has the largest reception electric power, for example.

When receiving the report of the number of the rough beam from the terminal, the base station performs transmission sweeping using accurate beams corresponding to the rough beam (Step S13). Transmission sweeping at this time may employ a sweeping pattern unique to the terminal, which has been specially prepared for the terminal. Alternatively, a sweeping pattern common to all terminals may be prepared, and the base station may notify each terminal of a portion to monitor. In the former case, the transmission sweeping pattern itself is unique to the terminal (UE specific). In the latter case, it may be said that the settings of the transmission sweeping pattern are unique to the terminal (UE specific).

The terminal reports the number of an accurate beam desired for the terminal in question to the base station (Step S14). The terminal determines the desired accurate beam on the basis of whether a beam has the largest reception electric power, for example.

When receiving the report of the number of the accurate beam from the terminal, the base station transmits DL user data to the terminal by using the accurate beam (Step S15). Then, in a case where channel reciprocity is supposed to be held, the base station uses the same accurate beam as the accurate beam for transmission to receive UL user data from the terminal (Step S16).

(CQI (Channel Quality Information) Acquisition)

When the beam sweeping process described above has been complete, an optimal transmission beam of the base station that is used between the base station and the terminal can be determined. DL CQI acquisition is grasping a channel quality and an interference status when the determined transmission beam is used. DL CQI acquisition is required for the terminal to notify, by using a feedback using a UL, which is called "CQI (Channel Quality Indicator) feedback," the base station of a modulation method and a coding rate that the terminal wants the base station to use in DL data transmission. This feedback is performed as follows: the base station transmits a DL reference signal to the terminal for DL CQI acquisition, and the terminal receives the DL reference signal for DL CQI acquisition to evaluate a channel status. With this, the terminal can determine a desired CQI (combination of modulation method and coding rate).

As described above, it is necessary that the base station first determine a desired transmission beam in the beam sweeping process, and the terminal determine a CQI in the CQI acquisition procedure and notify the CQI to the base station as a CQI feedback.

(URLLC and eMBB)

URLLC is a use case of Ultra High Reliability and Low Latency. Examples of the main use case include operating a drone and controlling a vehicle. eMBB is a use case of enhanced Mobile Broad Band and is a use case requiring the largest possible throughput, which corresponds to the related-art method of using cellular systems.

(Relationship Between Beam Management, CSI (Channel State Information) Acquisition, and User Data Transmission)

Figure 9:
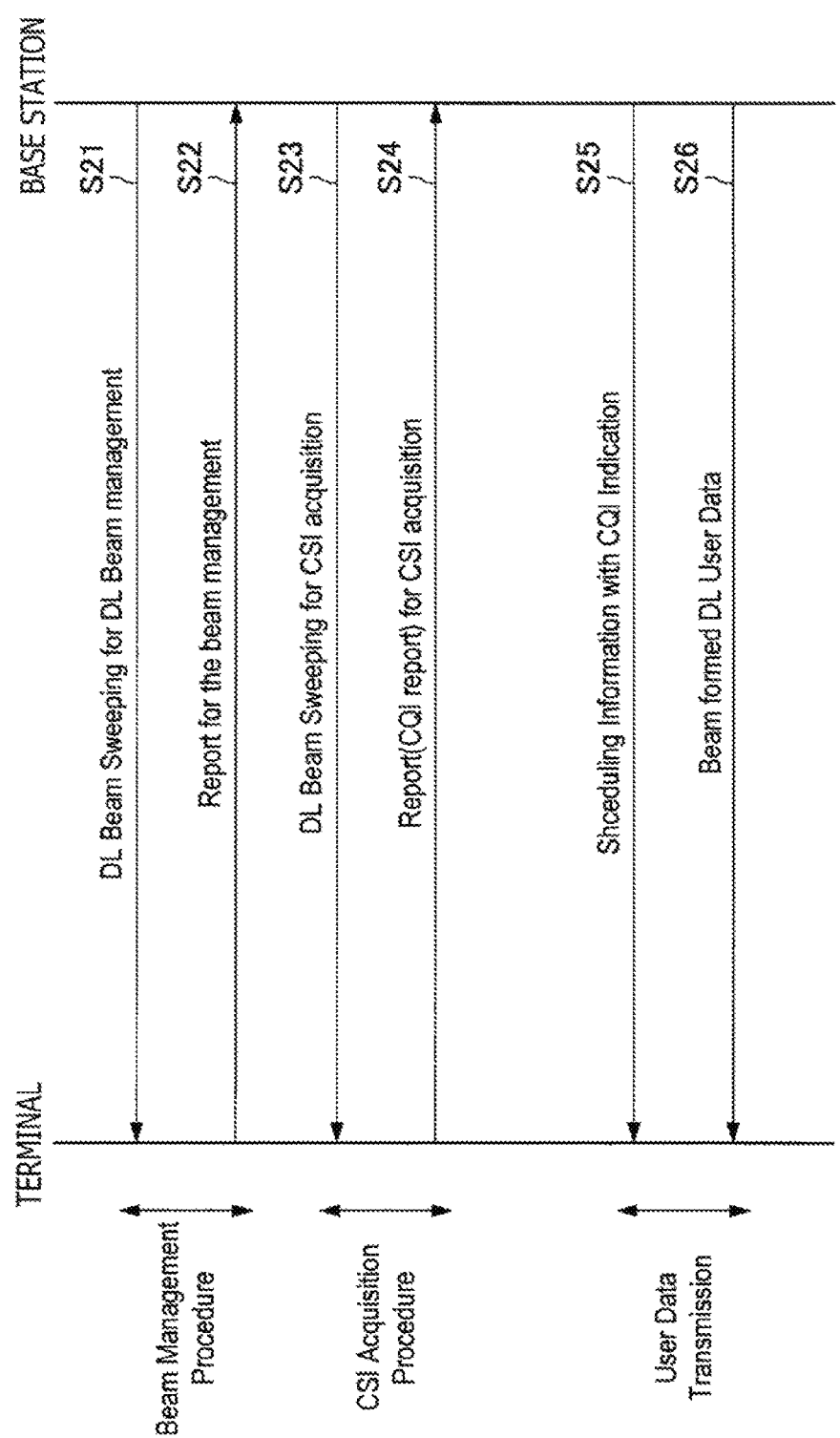
FIG. 9 is an explanatory diagram illustrating an example of transmission and reception of data by the base station and the terminal.

FIG. 9 is an explanatory diagram illustrating an example of transmission and reception of data by the base station and the terminal. FIG. 9 illustrates an example in which DL beam management and DL CSI acquisition are performed, and DL user data transmission is performed thereafter. The beam management is a procedure of selecting an appropriate beam that is used between the base station and the terminal. The CSI acquisition is a procedure of observing the channel status of a beam selected on the basis of a beam report from the terminal, to thereby determine a modulation method and an encoding rate that are usable in transmission.

First, the base station performs transmission sweeping for DL beam management on the terminal (Step S21). The base station transmits a reference signal subjected to beamforming. The base station provides plural beams in plural directions at different frequencies or times in a sweeping manner. The terminal replies a report for beam management to the base station (Step S22).

Next, the base station performs transmission sweeping for CSI acquisition on the terminal (Step S23). The base station transmits a reference signal by using a selected beam. The reference signal in this case desirably has a similar status to a signal to be actually used. In a case where the base station performs appropriate antenna weighting, such as TX precoding, the base station performs the processing and then transmits the reference signal. The terminal replies a report for CSI acquisition to the base station (Step S24). The terminal evaluates desired modulation method and encoding rate. The terminal reports, as a recommendation value, the evaluation result to the base station with a value called "CQI (Channel Quality Indication)."

The base station transmits schedule information to the terminal on the basis of the CQI transmitted from the terminal (Step S25), and transmits DL user data to the terminal by beamforming (Step S26). Prior to DL user data transmission, the base station notifies, with a control signal, the terminal of the modulation method and the encoding rate that are being used and frequency and time resources to be used in transmission.

Figure 10:
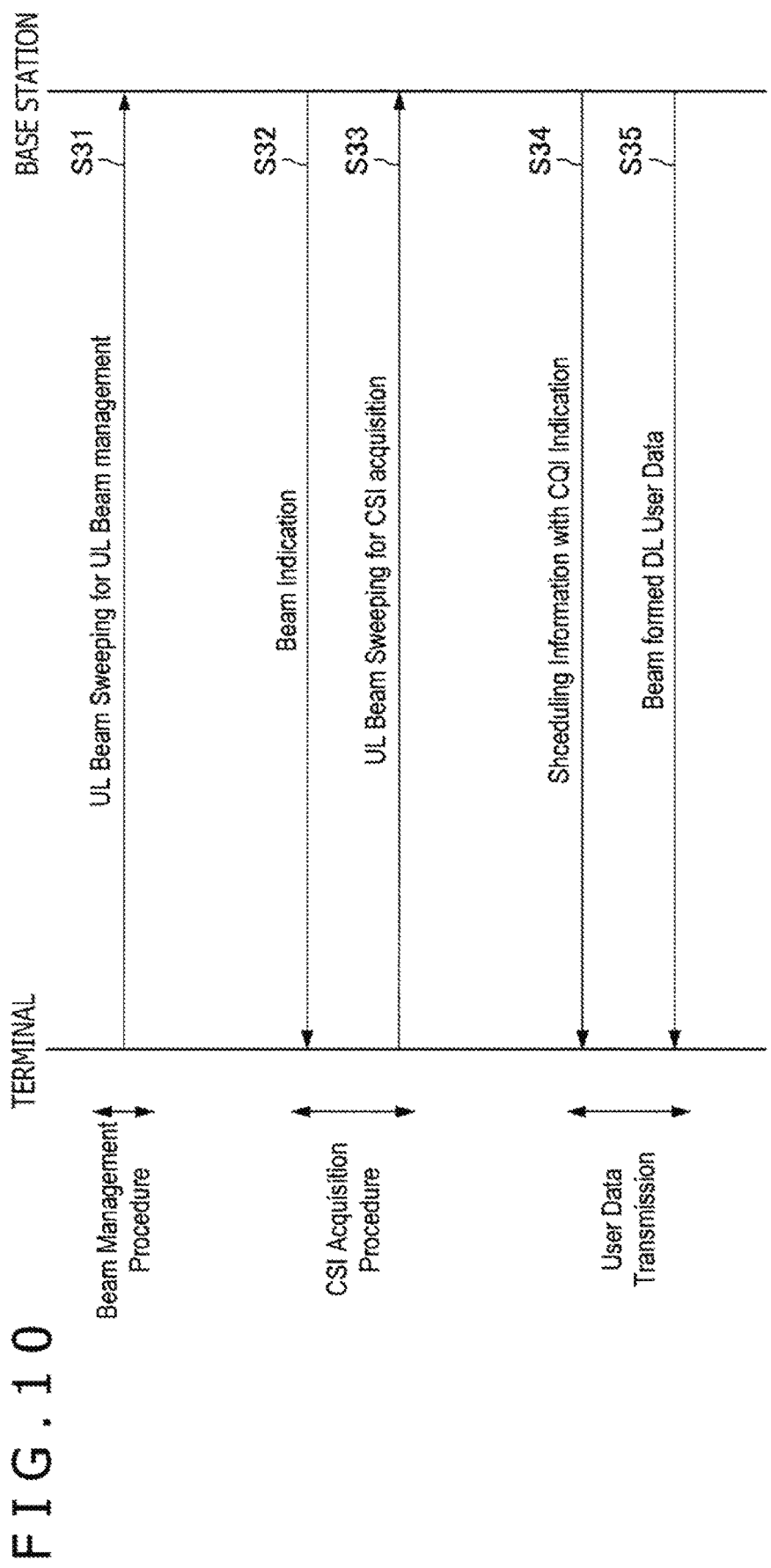
FIG. 10 is an explanatory diagram illustrating an example of transmission and reception of data by the base station and the terminal.

FIG. 10 is an explanatory diagram illustrating an example of transmission and reception of data by the base station and the terminal. FIG. 10 illustrates an example in which UL beam management and UL CSI acquisition are performed, and UL user data transmission is performed thereafter.

The terminal performs UL beam sweeping unique to the terminal (Step S31). This UL beam sweeping unique to the terminal is for UL beam management. The base station observes beam sweeping from the terminal, and specifies a beam required for CSI acquisition (Step S32).

The terminal transmits, by using the beam specified in Step S32, a reference signal subjected to beamforming (Step S33). The base station observes the reference signal to determine appropriate modulation method and encoding rate, and notifies, as a CQI indication, the terminal of the appropriate modulation method and encoding rate together with information specifying locations of UL resources (Step S34). The terminal transmits UL user data with the specified frequency and time resources by using the specified modulation method and encoding rate (Step S35).

In this way, in existing cellular systems, beam management, CSI acquisition, and user data transmission are normally performed in different times. In the existing cellular systems such as LTE, a reference signal that is used for CQI acquisition has been called "Sounding Reference Signal (SRS)," and transmitted with the last OFDM symbol of 14 OFDM symbols. Thus, user data and CQI acquisition have never collided with each other and coexisted in terms of resources. With regard to beam management, the existing cellular systems such as LTE have not had the beam management procedure, and hence a problem of a collision between beam management and CQI acquisition or user data has never arisen.

In future cellular systems, however, different procedures such as beam management, CSI acquisition, and a PDSCH (Physical Downlink Shared Channel) or a PUSCH (Physical Uplink Shared Channel), which corresponds to user data transmission, are sometimes unavoidably performed at the same frequency and the same time.

The existing cellular systems such as LTE have used a frequency band of 2 GHz for communication. However, the future cellular systems are going to use a frequency band of up to 100 GHz to perform communication. In order to compensate for a propagation loss due to a high frequency, it is necessary to use a sharp beam subjected to beamforming to have a large antenna gain. To manage this sharp beam, the beam management procedure has been required.

Also with regard to reference signals for CQI acquisition, it is assumed that, unlike the existing cellular system that is only required to transmit a reference signal with the last OFDM symbol of 14 OFDM symbols, the future cellular system is going to transmit a reference signal with, for example, a plurality of OFDM symbols by using a time resource that is too large to be shared with user data, in order to improve a gain. Thus, a collision between user data and the CQI acquisition procedure, which has not been a problem in the existing cellular systems, is now required to be taken into account.

In addition, a collision with a beam management procedure that is newly introduced in the future cellular systems is also required to be taken into account. Moreover, unlike the existing cellular systems, in the next generation communication scheme, the use case of eMBB and low latency and high reliability communication, which is called "URLLC," are required to be simultaneously accommodated, and due to the generation of this low latency and high reliability traffic, a procedure related to the traffic is required to be performed first even if there is another procedure. In this way, with the various backgrounds that the related-art existing cellular systems do not have, new points to consider have arisen.

In view of the points described above, the discloser of the subject application has made an intensive study on preferred behavior of a terminal in a case where beam management, CSI acquisition, and user data transmission are unavoidably performed at the same frequency and the same time. As a result, the discloser of the subject application has devised a technology related to the behavior of a terminal in the case where beam management, CSI acquisition, and user data transmission are unavoidably performed at the same frequency and the same time, which is described below.

[1.2. Configuration Example and Operation Example]

Figure 11:
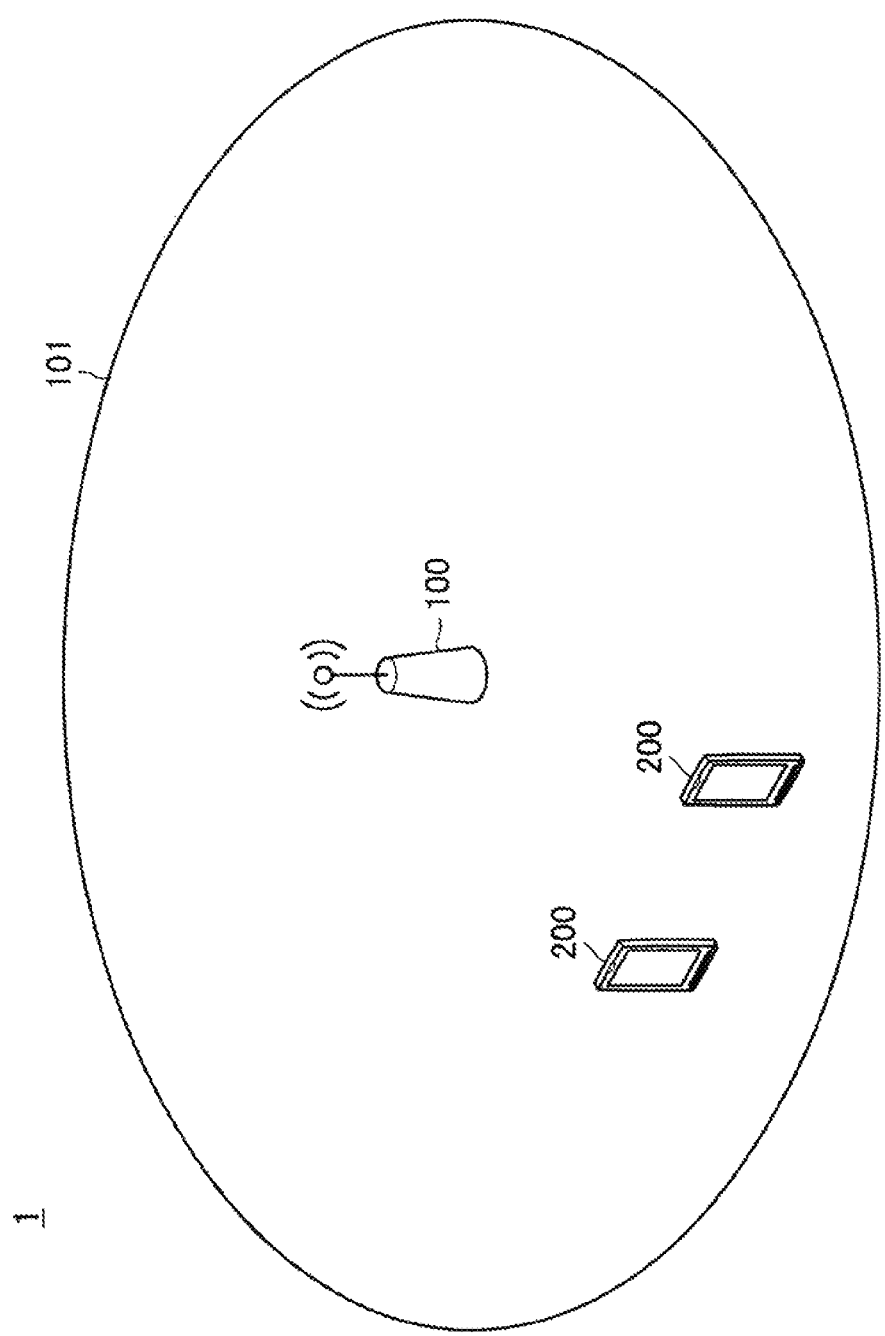
FIG. 11 is an explanatory diagram illustrating an example of the schematic configuration of a system according to an embodiment of the present disclosure.

First, with reference to the drawings, the schematic configuration of a system according to the embodiment of the present disclosure is described. FIG. 11 is an explanatory diagram illustrating an example of the schematic configuration of the system according to the embodiment of the present disclosure. With reference to FIG. 11, the system according to the embodiment of the present disclosure includes a base station 100 and a terminal apparatus 200. A system 1 is a system conforming to LTE, LTE-Advanced, or the fifth-generation mobile communication system (5G), or a communication standard equivalent thereto, for example.

(Base Station 100)

The base station 100 performs wireless communication with the terminal apparatus 200. For example, the base station 100 performs wireless communication with the terminal apparatus 200 positioned in a cell 101 of the base station 100.

In the embodiment of the present disclosure, in particular, the base station 100 performs beamforming. For example, the beamforming in question is large-scale MIMO beamforming. The beamforming in question may also be called "massive MIMO beamforming," "free dimension MIMO beamforming," or "three-dimensional beamforming." Specifically, for example, the base station 100 includes a directional antenna usable in large-scale MIMO, and multiplies a weight set for the directional antenna in question to a transmission signal, to thereby perform large-scale MIMO beamforming.

(Terminal Apparatus 200)

The terminal apparatus 200 performs wireless communication with the base station 100. For example, the terminal apparatus 200 performs wireless communication with the base station 100 in a case of being positioned in the cell 101 of the base station 100.

Subsequently, with reference to FIG. 12 and FIG. 13, examples of the configurations of the base station 100 and the terminal apparatus 200 are described.

Figure 12:
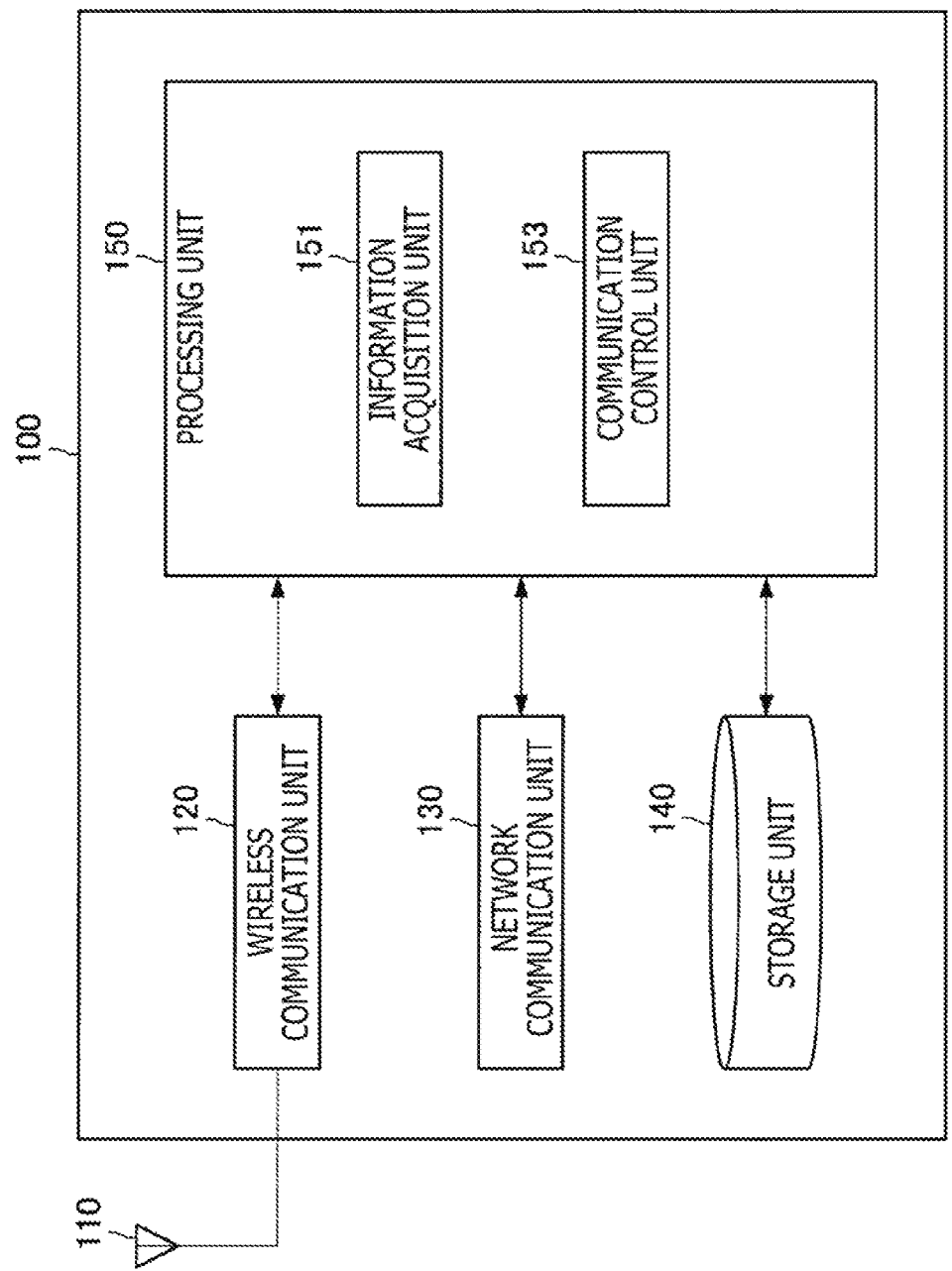
FIG. 12 is an explanatory diagram illustrating an example of the configuration of a base station 100 according to the embodiment.

First, with reference to FIG. 12, the example of the configuration of the base station 100 according to the embodiment of the present disclosure is described. FIG. 12 is a block diagram illustrating the example of the configuration of the base station 100 according to the embodiment of the present disclosure. With reference to FIG. 12, the base station 100 includes an antenna unit 110, a wireless communication unit 120, a network communication unit 130, a storage unit 140, and a processing unit 150.

(Antenna Unit 110)

The antenna unit 110 emits, to space, signals output by the wireless communication unit 120 as radio waves. Further, the antenna unit 110 converts radio waves in space to signals, and outputs the signals in question to the wireless communication unit 120.

For example, the antenna unit 110 includes a directional antenna. For example, the directional antenna in question is a directional antenna usable in large-scale MIMO.

(Wireless Communication Unit 120)

The wireless communication unit 120 transmits and receives signals. For example, the wireless communication unit 120 transmits downlink signals to the terminal apparatus 200, and receives uplink signals from the terminal apparatus 200.

(Network Communication Unit 130)

The network communication unit 130 transmits and receives information. For example, the network communication unit 130 transmits information to another node and receives information from the another node. Examples of the another node in question include another base station and a core network node.

(Storage Unit 140)

The storage unit 140 stores data and programs for operation of the base station 100.

(Processing Unit 150)

The processing unit 150 provides various functions of the base station 100. The processing unit 150 includes an information acquisition unit 151 and a control unit 153. Note that the processing unit 150 may further include components other than these components. That is, the processing unit 150 may perform operation other than operation of these components.

How the information acquisition unit 151 and the control unit 153 specifically operate is described in detail below.

Specifically, the information acquisition unit 151 acquires information transmitted from the terminal apparatus 200, in particular, information regarding the reception status of beams transmitted by the base station 100.

Further, the control unit 153 performs control on transmission of beams from the base station 100 and the settings of beam sweeping, for example.

Figure 13:
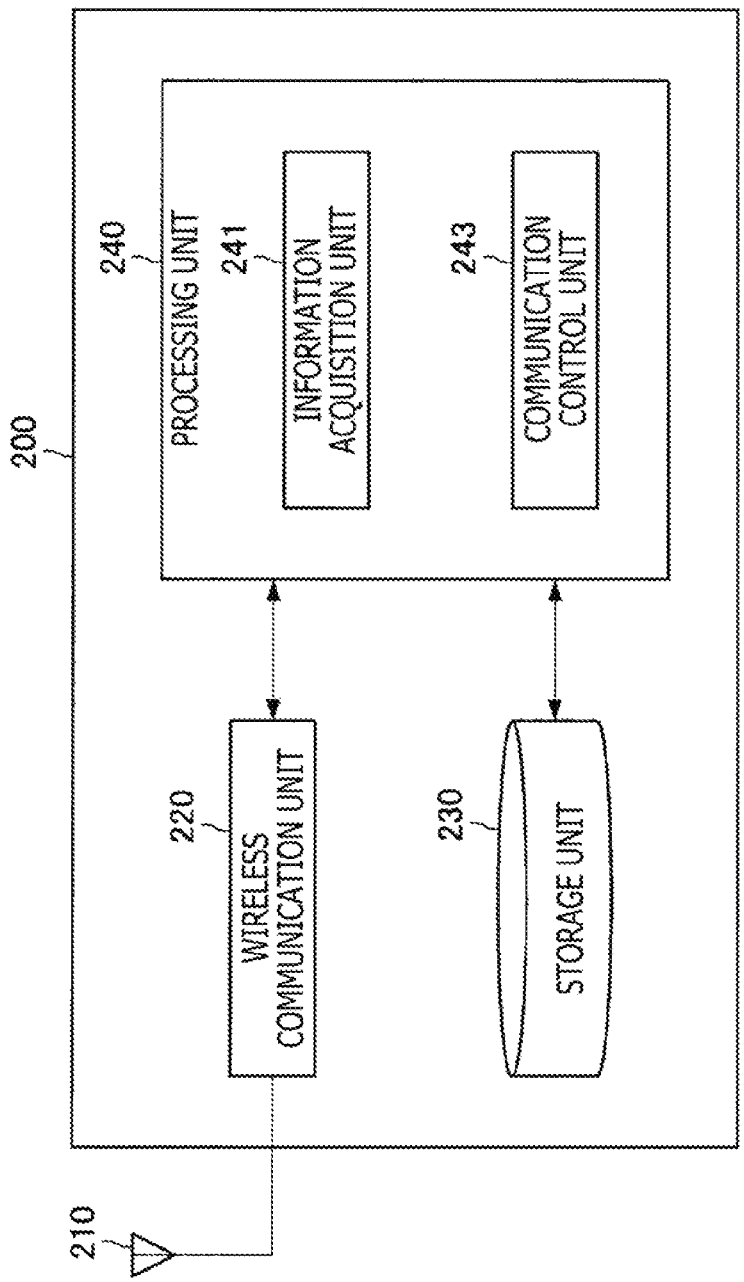
FIG. 13 is an explanatory diagram illustrating an example of the configuration of a terminal apparatus 200 according to the embodiment.

Next, with reference to reference FIG. 13, the example of the configuration of the terminal apparatus 200 according to the embodiment of the present disclosure is described. FIG. 13 is a block diagram illustrating the example of the configuration of the terminal apparatus 200 according to the embodiment of the present disclosure. With reference to FIG. 13, the terminal apparatus 200 includes an antenna unit 210, a wireless communication unit 220, a storage unit 230, and a processing unit 240.

(Antenna Unit 210)

The antenna unit 210 emits, to space, signals output by the wireless communication unit 220 as radio waves. Further, the antenna unit 210 converts radio waves in space to signals, and outputs the signals in question to the wireless communication unit 220.

(Wireless Communication Unit 220)

The wireless communication unit 220 transmits and receives signals. For example, the wireless communication unit 220 receives downlink signals from the base station 100, and transmits uplink signals to the base station 100.

(Storage Unit 230)

The storage unit 230 stores data and programs for operation of the terminal apparatus 200.

(Processing Unit 240)

The processing unit 240 provides various functions of the terminal apparatus 200. The processing unit 240 includes an information acquisition unit 241 and a control unit 243. Note that the processing unit 240 may further include components other than these components. That is, the processing unit 240 may perform operation other than operation of these components.

How the information acquisition unit 241 and the control unit 243 specifically operate is described in detail below. Specifically, the control unit 243 selects, on the basis of a predetermined requirement, a procedure to be executed in a case where plural procedures conflict with each other in a frequency or time domain, or a case where an electric power resource is insufficient for execution of the plural procedures.

Subsequently, the operation of the terminal apparatus 200 is described. Here, procedures to consider are, as described above, beam management, CSI acquisition, and user data transmission each of which has downlink and uplink procedures. This means that the number of combinations is huge. Accordingly, in the following, cases considered to be particularly important are only described. The remaining cases include unimportant cases and important cases. What is important is that anything that is conceivable on the basis of the following description belongs to the scope of the present disclosure.

The terminal apparatus 200 according to the present embodiment uses uplink common frequency and time resources in different procedures such as beam management, CSI acquisition, and data in a shared manner. The terminal apparatus 200 decides the priority of each procedure. The terminal apparatus 200 is characterized by notifying, with an indicator indicating a procedure, the base station 100 of which procedure the terminal apparatus 200 is performing. Here, a PHY indicator may be included in a common resource. Further, the indicator may be included in a UL common control signal.

Further, the base station 100 according to the present embodiment uses downlink common frequency and time resources in different procedures such as beam management, CSI acquisition, and data in a shared manner. The base station 100 decides the priority of each procedure. The base station 100 is characterized by notifying, with an indicator indicating a procedure, the terminal apparatus 200 of which procedure the base station 100 is performing, and the terminal apparatus 200 performs reception processing by using the indicator.

The prerequisites are summarized in Table 1 below. In Table 1, "CC" stands for "component carrier."

TABLE 1

| Prerequisites | Contents |
| --- | --- |
| In a terminal/between plural terminals | In the same terminal |
| In one CC/between plural CCs | In one CC |
| Procedures causing congestion | UL UE specific beam management beam sweeping UL CSI acquisition UL user data (low latency) |
| UL/DL | Focus mainly on a conflict between UL procedures |

(Table 1: prerequisites of the present embodiment)

In the present embodiment, a conflict between plural procedures in the same terminal in one CC is considered. The following two cases are conceivable as cases where the terminal apparatus 200 can or cannot simultaneously perform plural procedures.

(Case 1)

This is a case where since there is not an enough frequency or time resource, on the basis of traffic requirements, one or plural procedures of the three procedures in Table 1 are selected on the basis of the priority to be executed, and procedures determined not to be executed with the frequency or time resource are executed with another time or resource, or skipped.

(Case 2)

This is a case where a power amplifier of the terminal apparatus 200 has a limited capability, and the terminal apparatus 200 cannot simultaneously transmit a plurality of procedures due to the limited capability of the power amplifier. In this case, even when the base station 100 appropriately allocates resources to the terminal apparatus 200, the terminal apparatus 200 does not have enough transmission electric power to simultaneously transmit the plurality of procedures.

Case 1 is first described. First, when the case where procedures conflict with each other in terms of frequency or time resources (a case where the procedures compete for the resource) happens is described. Table 2 is a table illustrating examples of cases where the respective procedures are supposed to be prioritized in the terminal apparatus 200.

TABLE 2

| Cases requiring prioritized transmission | Items | |
| --- | --- | --- |
| 1 | UL user data | A case where user data requiring low latency is suddenly transmitted by an uplink |
| 2 | UL CSI acquisition | A case where, for data to be transmitted by a downlink, downlink channel characteristics are suddenly grasped from uplink channel characteristics through UL CSI acquisition with the use of channel reciprocity (channel reversibility) to acquire a DL channel status |
| 3 | UL beam management | A case where the need of beam sweeping for UL beam management suddenly arises since beam maintenance or tracking has failed |

(Table 2: specific examples of prioritized transmission)

Case 1 in Table 2 that requires prioritized transmission includes a case where the need of UL user data suddenly arises. Since UL user data requires low latency uplink transmission, the terminal apparatus 200 is sometimes supposed to transmit an uplink without the permission of the base station 100. In such a case, UL user data requiring low latency is sometimes transmitted with the use of resources originally reserved for UL CSI acquisition or UL beam management.

Table 3 illustrates the priority of each procedure in Case 1 that requires prioritized transmission.

TABLE 3

| Prioritization | Items |
| --- | --- |
| 1 (high) | UL user data |
| 2 | UL CSI acquisition |
| 3 (low) | UL beam management |

(Table 3: priority of each procedure in Case 1 that requires prioritized transmission)

In Table 3, UL CSI acquisition has a higher priority than UL beam management, but which one has a higher priority is not a matter. What is important here is that UL user data has the highest priority.

Case 2 in Table 2 that requires prioritized transmission includes a case where the need of UL CSI acquisition suddenly arises. Data requiring low latency and low latency is required not only for uplinks but also for downlinks. In the case of TDD, a downlink channel can be estimated from an uplink channel. This is called that "channel reversibility (UL/DL channel reciprocity) is held." In that case, in a case where the need of transmission of data requiring low latency by a downlink suddenly arises, the base station 100 may suddenly need to perform the UL CQI acquisition procedure. Here, DL CQI acquisition may by performed instead, but since UL CQI acquisition, which utilizes reversibility, has an advantage of allowing the base station 100 to simultaneously estimate channels to a plurality of base stations, UL CQI acquisition is often performed. At this time, beam sweeping for UL beam management set to semi-static cannot be suddenly changed in some cases. In that case, the terminal apparatus 200 determines to perform the UL CQI acquisition procedure instead of UL beam management, thereby executing UL CQI acquisition.

Table 4 illustrates the priority of each procedure in Case 2 that requires prioritized transmission.

TABLE 4

| Prioritization | Items |
| --- | --- |
| 1 (high) | UL CSI acquisition |
| 2 (low) | UL beam management |

(Table 4: priority of each procedure in Case 2 that requires prioritized transmission)

What is important in suddenly performing the beam management procedure in this UL CSI acquisition area is that the format of beam management is transmissible in the format of UL CSI acquisition. In CSI acquisition, a reference signal for covering a wide bandwidth in terms of frequencies is transmitted, but in beam management, such a wide bandwidth is not necessarily required to be covered. While CSI acquisition supports a very limited number of beams, in beam management, it is necessary to transmit a reference signal that supports more beams than CSI acquisition.

Case 3 in Table 2 that requires prioritized transmission includes a case where the need of the beam management procedure suddenly arises. Beam tracking is required for stable uplink communication. "Tracking" means periodically updating an appropriate beam between the terminal and the base station. There is a case where vehicles or humans come between the base station and the terminal, and the link of a beam between the base station and the terminal is thus lost, with the result that the need of the beam management procedure suddenly arises. Case 3 is an unforeseen event, and is a case where UL beam management is to be performed first even if scheduled UL CSI acquisition or UL user data has to be stopped.

Table 5 illustrates the priority of each procedure in Case 3 that requires prioritized transmission.

TABLE 5

| Prioritization | Items |
| --- | --- |
| 1 (high) | UL beam management |
| 2 | UL CSI acquisition |
| 3 (low) | UL user data |

(Table 5: priority of each procedure in Case 3 that requires prioritized transmission)

Figure 14:
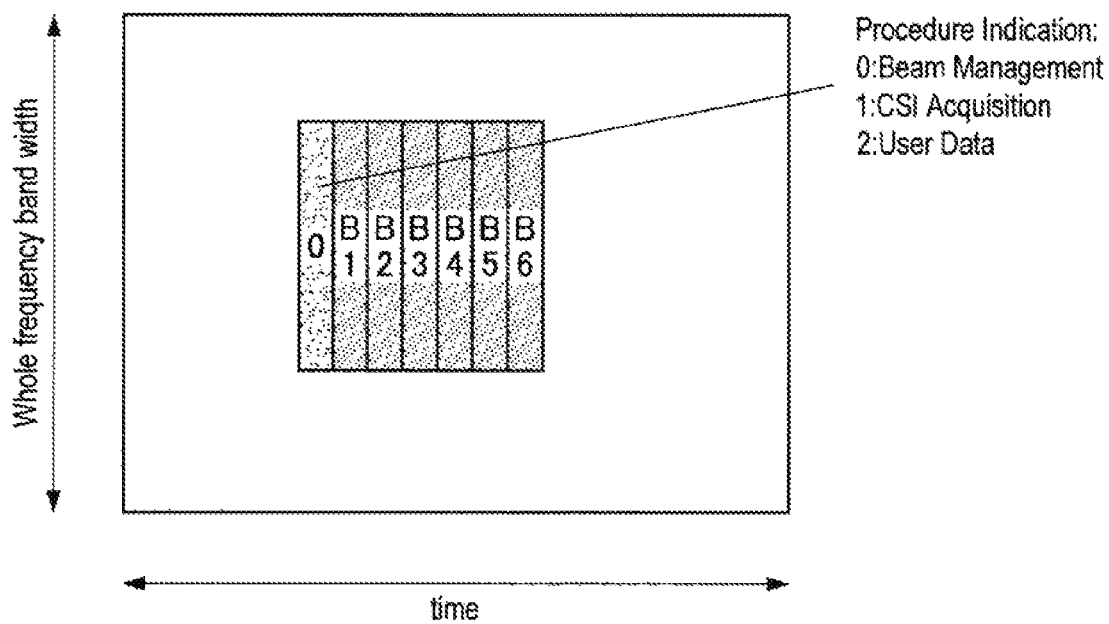
FIG. 14 is an explanatory diagram illustrating the format of UL beam management.
Figure 15:
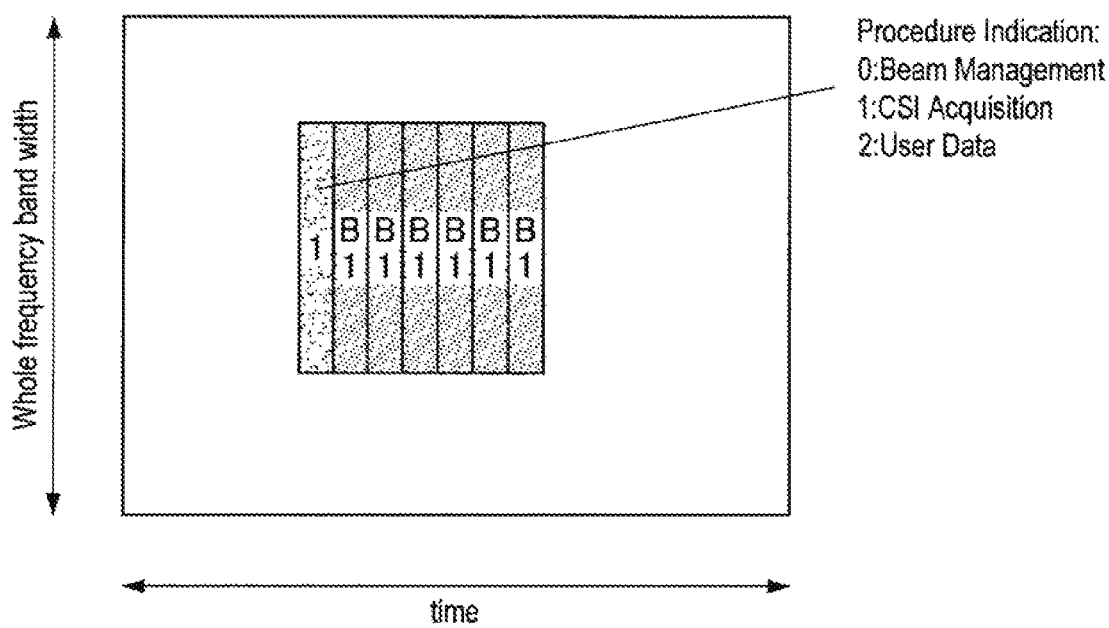
FIG. 15 is an explanatory diagram illustrating the format of UL CQI acquisition.
Figure 16:
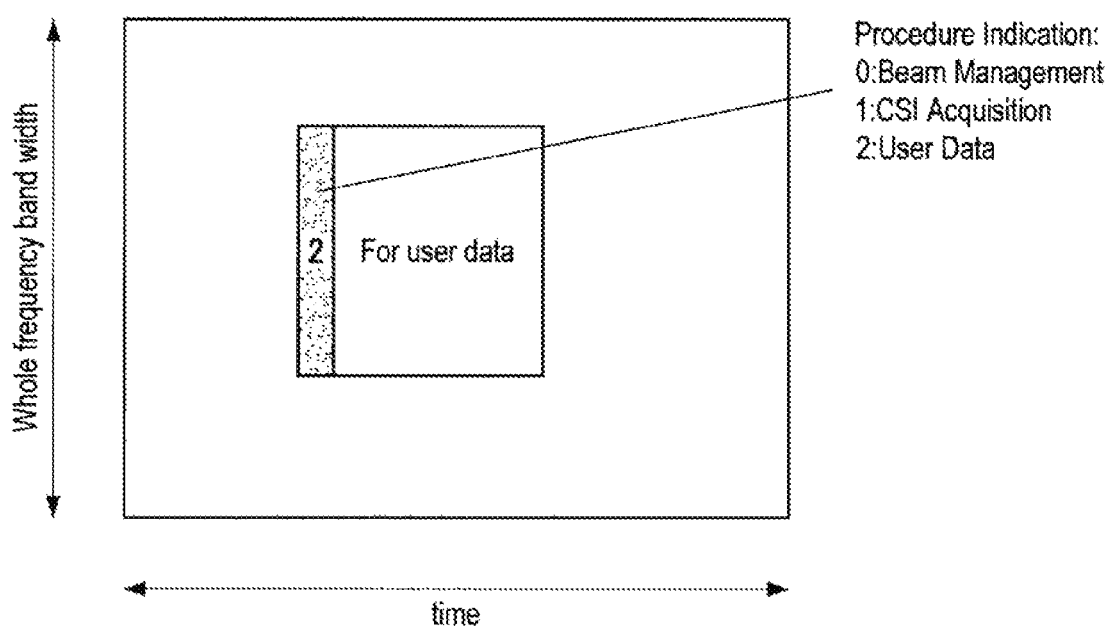
FIG. 16 is an explanatory diagram illustrating a case where a resource is being used by UL user data.

FIG. 14 is an explanatory diagram illustrating the format of UL beam management. FIG. 15 is an explanatory diagram illustrating the format of UL CQI acquisition. FIG. 16 is an explanatory diagram illustrating a case where a resource is being used by UL user data. A resource that is used in the beam management procedure is a reference signal for beam management. A resource that is used in the CQI acquisition procedure is a reference signal for CQI acquisition. A resource that is used in user data transmission is user data.

In the present embodiment, these three procedures each have, in its beginning, information indicating whether the procedure is UL beam management, UL CQI acquisition, or user data (procedure indication). In the case of this example, 0 represents a resource used for UL beam management, 1 represents a resource used for CQI acquisition, and 2 represents a resource used for user data. This procedure indication may be transmitted by being set to the beginning of the reference signal or transmitted by an uplink control signal separately. In this way, with a format compatible with any format, even when the need of a procedure having high priority suddenly arises, the order of procedures can be switched. This enables short-time switching that cannot be achieved by RRC signaling, for example. With RRC signaling, it is impossible to suddenly switch procedures. Meanwhile, with the information representing a procedure indicated by the indicator in this way, a case where the need of switching based on priority suddenly arises can be dealt with. When the terminal apparatus 200 conveys information to the base station 100 by a procedure indication clearly indicating requested procedures, the base station 100 can correctly decide which one of the procedures has been transmitted and correctly process a necessary procedure.

A difference between the format of UL beam management and the format of UL CQI acquisition is described. In the format of UL beam management illustrated in FIG. 14, sweep is performed with beams B1 to B6 in different directions. In contrast to this, in the format of UL CQI acquisition illustrated in FIG. 15, which is intended to be used to measure a channel quality of a specified beam, only the beam B1 is transmitted a plurality of times. With regard to user data, user data is put in portions for sweep and channel quality measurement.

Figure 17:
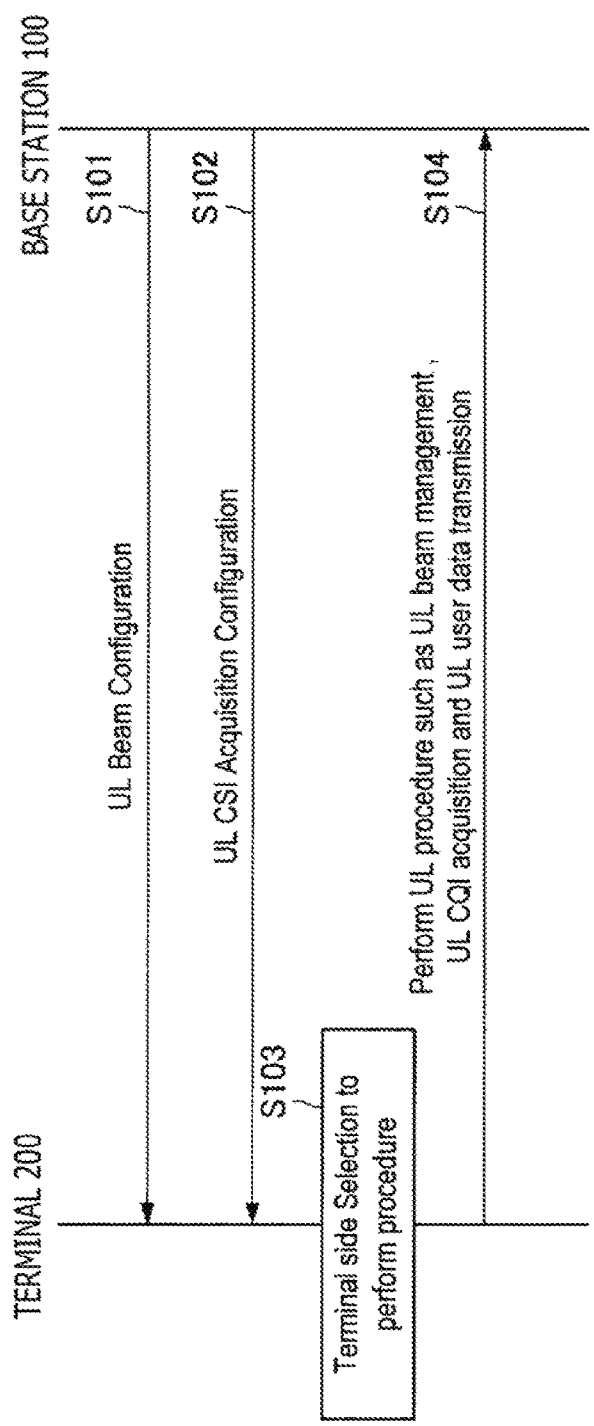
FIG. 17 is a flowchart illustrating operation examples of the base station 100 and the terminal apparatus 200 according to the embodiment.

FIG. 17 is a flowchart illustrating operation examples of the base station 100 and the terminal apparatus 200 according to the embodiment of the present disclosure. FIG. 17 illustrates operation examples of the base station 100 and the terminal apparatus 200 when plural procedures collide with each other in the terminal apparatus 200, and the terminal apparatus 200 selects one of the procedures.

The base station 100 transmits the settings of uplink beams to the terminal apparatus 200 (Step S101). Subsequently, the base station 100 transmits the settings of UL CQI acquisition to the terminal apparatus 200 (Step S102).

Here, when plural procedures collide with each other, the terminal apparatus 200 selects one of the plural procedures on the basis of the priority as described above (Step S103). After selecting the procedure, the terminal apparatus 200 transmits data based on the selected procedure to the base station 100 (Step S104).

Uplink communication has been described above, but the same may hold true for the case of downlinks. Table 6 is a table illustrating prerequisites of the present embodiment.

TABLE 6

| Prerequisites | Contents |
| --- | --- |
| In a terminal/between plural terminals | In the same terminal |
| In one CC/between plural CCs | In one CC |
| Procedures causing congestion | DL UE specific beam management beam sweeping DL CSI acquisition DL user data (low latency) |

TABLE 6-continued

| Prerequisites | Contents |
| --- | --- |
| UL/DL | Focus mainly on a conflict between DL procedures |

(Table 6: prerequisites of the present embodiment)

Table 7 is a table illustrating examples of cases where the respective procedures are supposed to be prioritized in the base station 100.

TABLE 7

| Cases requiring prioritized transmission | Items | |
| --- | --- | --- |
| 1 | DL user data | A case where user data requiring low latency is suddenly transmitted by a downlink |
| 2 | DL CSI acquisition | A case where, for data to be transmitted by a downlink, downlink channel characteristics are suddenly acquired through DL CSI acquisition to acquire a DL channel status |
| 3 | UL beam management | The need of beam sweeping for DL beam management suddenly arises since beam maintenance or tracking has failed |

(Table 7: specific examples of prioritized transmission)

The base station 100 decides the priority of each procedure by using tables in which "uplink (UL)" in Tables 3 to 5 above is replaced with "downlink (DL)."

Next, an example of Case 2 above is described. In Table 8, prerequisites of the present embodiment in Case 2 are illustrated.

TABLE 8

| Prerequisites | Contents |
| --- | --- |
| In a terminal/between plural terminals | In the same terminal |
| In one CC/between plural CCs | In plural CCs |
| Procedures causing congestion | UL UE specific beam management beam sweeping UL CSI acquisition UL user data (low latency) |
| UL/DL | Focus mainly on a conflict between UL procedures |

(Table 8: prerequisites of the present embodiment)

The power amplifier for transmission has a limited capability, and hence the terminal requires a very large amount of electric power to simultaneously perform a plurality of procedures. In particular, in beam management, which is a procedure that is performed prior to a determination on an optimal beam between the base station and the terminal, beams that are transmitted from the terminal sometimes have a large amount of electric power so that the beams are positively received. Further, since CQI acquisition requires transmission that occupies a wide frequency bandwidth and transmission that occupies a plurality of time slots is performed, CQI acquisition requires a large amount of electric power. Meanwhile, user data transmission does not use an entire available frequency bandwidth so often. This is because the terminal performs data transmission in cooperation with another terminal.

There may be a case where when the terminal communicates with the base station by using plural component carriers CC1 to CC4, the CSI acquisition procedure simultaneously occurs in CC1 and CC2. If beam management is being performed in CC3 and user data transmission is being performed in CC4 at this time, since electric power that the terminal can use is limited, the terminal has to decide which procedure has a higher priority.

In view of this, the terminal apparatus 200 according to the present embodiment is characterized by stopping, in order not to exceed the capability of the power amplifier, transmission associated with any of the procedures of beam management, CSI acquisition, and UL user data transmission, to thereby reduce electric power to be used.

In order not to exceed the capability of the power amplifier, the terminal apparatus 200 according to the present embodiment may create beams not to be transmitted in transmission associated with beam sweeping for beam management, to thereby save electric power. Here, the terminal apparatus 200 according to the present embodiment may stop, in order to create beams not to be transmitted, beam sweeping for the links of beams kept being emitted to enhance resistance to obstacles such as vehicles or humans.

Further, in order not to exceed the capability of the power amplifier, the terminal apparatus 200 according to the present embodiment may reduce a frequency bandwidth in CSI acquisition only in a case where electric power is insufficient. Further, in order not to exceed the capability of the power amplifier, the terminal apparatus 200 according to the present embodiment may reduce the number of repetitive transmissions required for CSI acquisition. Further, in order not to exceed the capability of the power amplifier, the terminal apparatus 200 according to the present embodiment may stop CSI acquisition transmission itself.

Figure 18:
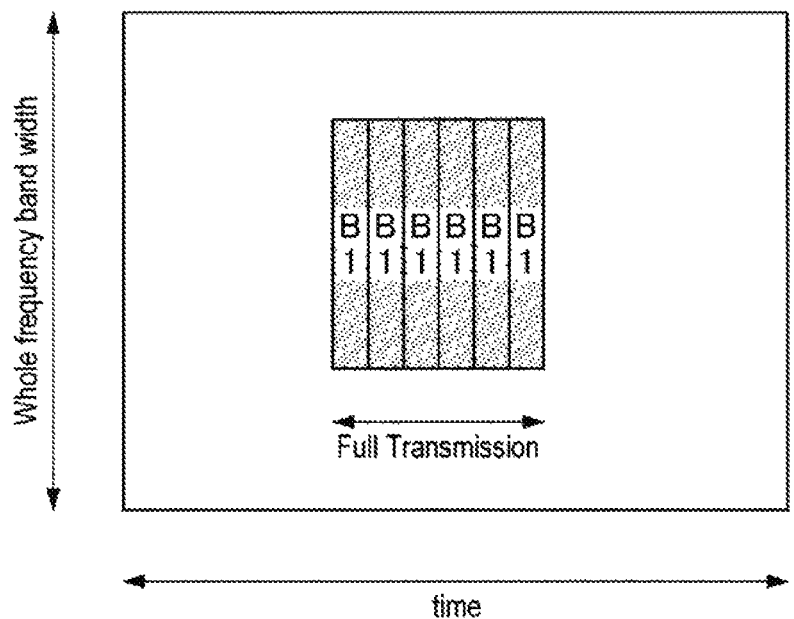
FIG. 18 is an explanatory diagram illustrating an example of resources that the terminal apparatus 200 uses to transmit UL CSI acquisition.
Figure 19:
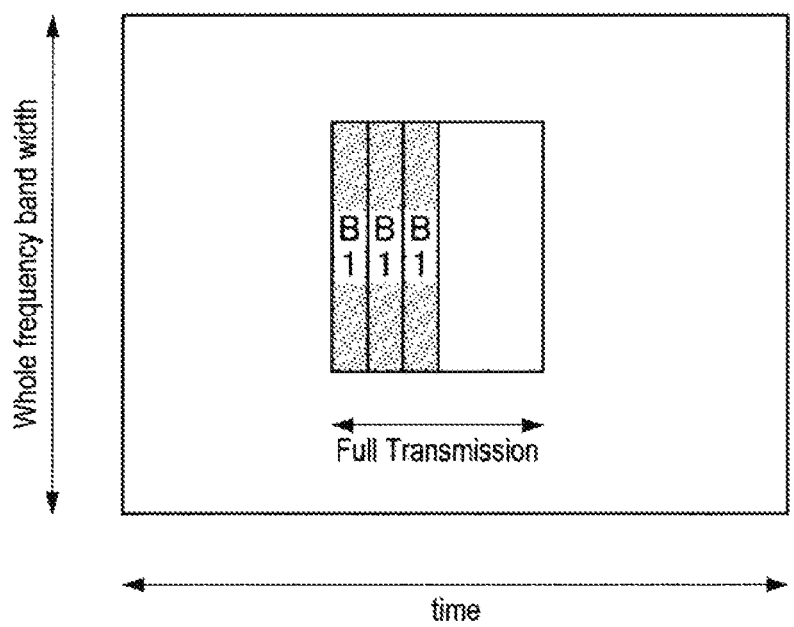
FIG. 19 is an explanatory diagram illustrating an example of resources that the terminal apparatus 200 uses to transmit UL CSI acquisition.

FIG. 18 is an explanatory diagram illustrating an example of resources that the terminal apparatus 200 uses to transmit UL CSI acquisition. In the example illustrated in FIG. 18, the terminal apparatus 200 transmits UL CSI acquisition six times by using the same beam B1. In a case where the capability of the power amplifier is insufficient, the terminal apparatus 200 may reduce the number of transmissions to secure electric power. FIG. 19 is an explanatory diagram illustrating an example of resources that the terminal apparatus 200 uses to transmit UL CSI acquisition. In the example illustrated in FIG. 19, the terminal apparatus 200 transmits UL CSI acquisition three times, reducing from six times, by using the same beam B1.

Figure 20:
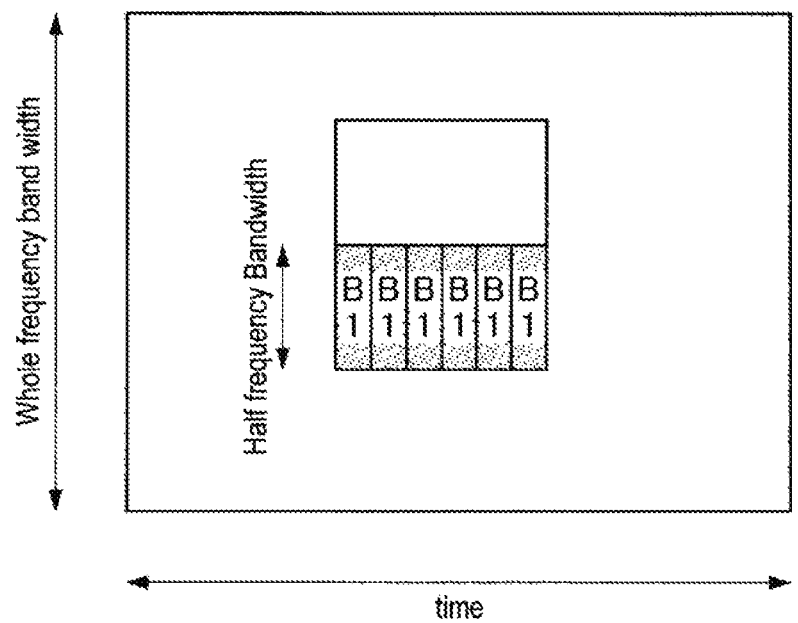
FIG. 20 is an explanatory diagram illustrating an example of resources that the terminal apparatus 200 uses to transmit UL CSI acquisition.

FIG. 20 is an explanatory diagram illustrating an example of resources that the terminal apparatus 200 uses to transmit UL CSI acquisition. In the example illustrated in FIG. 20, the terminal apparatus 200 transmits UL CSI acquisition six times by using the same beam B1 with a bandwidth that is half the bandwidth in the example illustrated in FIG. 18. In this way, the terminal apparatus 200 may reduce the bandwidth by half to secure electric power.

Figure 21:
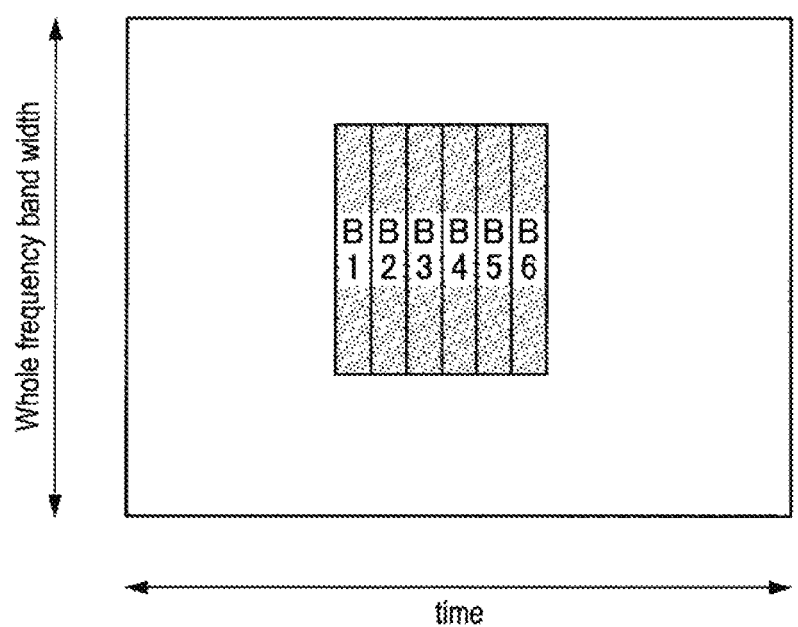
FIG. 21 is an explanatory diagram illustrating an example of resources that the terminal apparatus 200 uses to perform beam sweeping for beam management.
Figure 22:
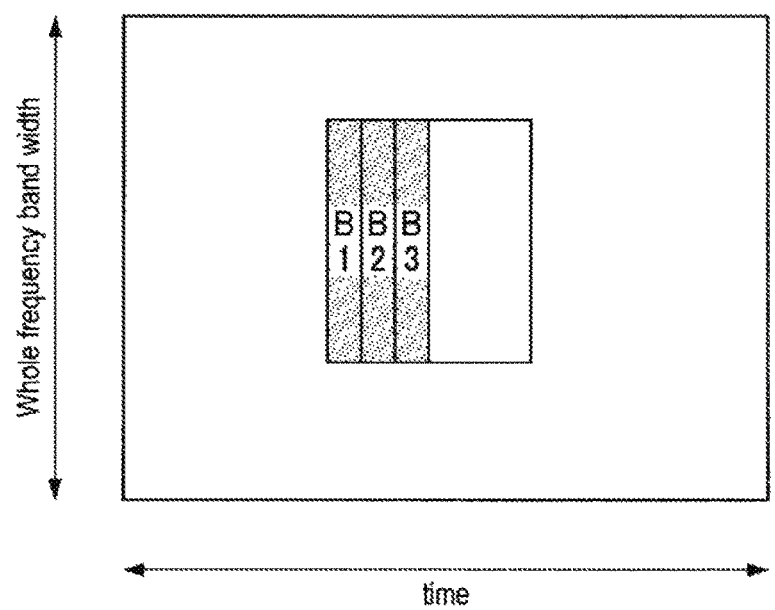
FIG. 22 is an explanatory diagram illustrating an example of resources that the terminal apparatus 200 uses to perform beam sweeping for beam management.

FIG. 21 is an explanatory diagram illustrating an example of resources that the terminal apparatus 200 uses to perform beam sweeping for beam management. FIG. 21 illustrates the example in which the terminal apparatus 200 performs beam sweeping by using six beams. In a case where the capability of the power amplifier is insufficient, the terminal apparatus 200 may reduce the number of beams to be used in this beam sweeping to secure electric power. FIG. 22 is an explanatory diagram illustrating an example of resources that the terminal apparatus 200 uses to perform beam sweeping for beam management. FIG. 22 illustrates the example in which the terminal apparatus 200 performs beam sweeping by using three beams out of six beams. For example, beams in important directions are used as the first three and beams not so important are used as the rest. The terminal apparatus 200 can perform beam sweeping with beams reduced in number in this way, thereby securing electric power. As a matter of course, the terminal apparatus 200 is not limited to the examples, and can also take a method of performing beam sweeping while stopping a given beam, thereby securing electric power.

Figure 23:
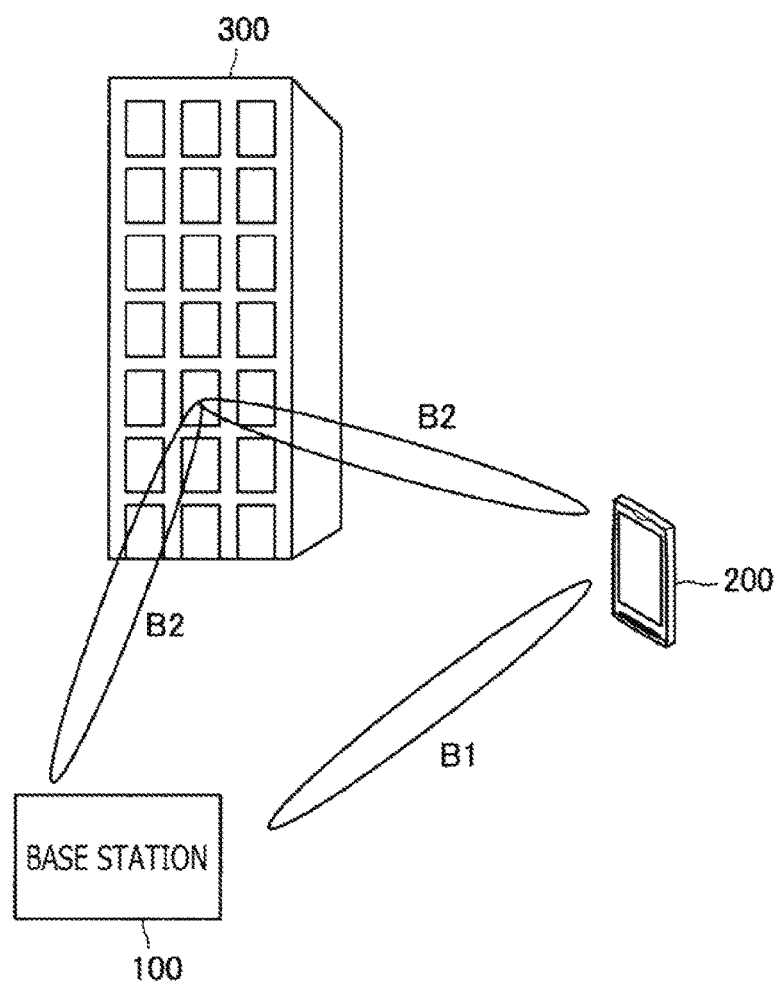
FIG. 23 is an explanatory diagram illustrating an example in which a beam that travels in a plurality of directions to establish communication between the base station 100 and the terminal 200 is selected.

Another method of reducing the number of beams is described. In order to enhance resistance to interference with radio waves due to objects, such as vehicles or humans, coming between the base station 100 and the terminal apparatus 200, a beam that travels in a plurality of directions to establish communication between the base station 100 and the terminal 200 is sometimes selected. FIG. 23 is an explanatory diagram illustrating an example in which a beam that travels in a plurality of directions to establish communication between the base station 100 and the terminal 200 is selected. One of the paths directly connects the base station 100 and the terminal apparatus 200 to each other by the beam B1, and the other path connects the base station 100 and the terminal apparatus 200 to each other by the beam B2 reflected on the wall of a building 300. In this case, one of the beams functions as backup. When electric power is insufficient, the terminal apparatus 200 skips the UL beam management procedure for tracking and maintenance of the beam kept being emitted to function as backup. For example, in a case where the beam B1 is regarded as a main beam, the terminal apparatus 200 stops uplink beam transmission with the beam B2 by beam management. By stopping transmission of a beam that functions as backup, the terminal apparatus 200 can reduce electric power.

Further, in order not to exceed the capability of the power amplifier, the terminal apparatus 200 according to the present embodiment may stop the UL beam management procedure itself.

Further, in order not to exceed the capability of the power amplifier, the terminal apparatus 200 according to the present embodiment may stop uplink user data transmission itself.

Next, how the terminal apparatus 200 adjusts the procedures on the basis of priority is described. When user data that the terminal apparatus 200 is to transmit requires low latency, the priority of the data is high. For example, with priority set as illustrated in Tables 3 to 5 in each case as illustrated in Table 2, the terminal apparatus 200 can adjust the procedures on the basis of the priority.

2. APPLICATION EXAMPLE

The technology according to the present disclosure is applicable to various products. For example, the base station 100 may be realized as any type of eNB (evolved Node B) such as a macro eNB or a small eNB. A small eNB may be an eNB that covers a smaller cell than a macro cell, such as a pico eNB, a micro eNB, or a home (femto) eNB. Alternatively, the base station 100 may be realized as another type of base station such as a Node B or a BTS (Base Transceiver Station). The base station 100 may include a main body configured to control wireless communication (also referred to as "base station apparatus") and one or more RRHs (Remote Radio Heads) disposed in a different place from the main body. Further, various types of terminals, which are described later, may operate as the base station 100 by temporarily or semi-permanently executing the base station function.

Further, for example, the terminal apparatus 200 may be realized as a mobile terminal such as a smartphone, a tablet PC (Personal Computer), a notebook computer, a portable game terminal, a portable/dongle type mobile router, or a digital camera, or an in-vehicle terminal such as a car navigation apparatus. Further, the terminal apparatus 2200 may be realized as a terminal configured to perform M2M (Machine To Machine) communication (also referred to as "MTC (Machine Type Communication) terminal"). In addition, the terminal apparatus 2200 may be a wireless communication module that is mounted on such a terminal (for example, an integrated circuit module including one die).

Application Example of Base Station

First Application Example

Figure 24:
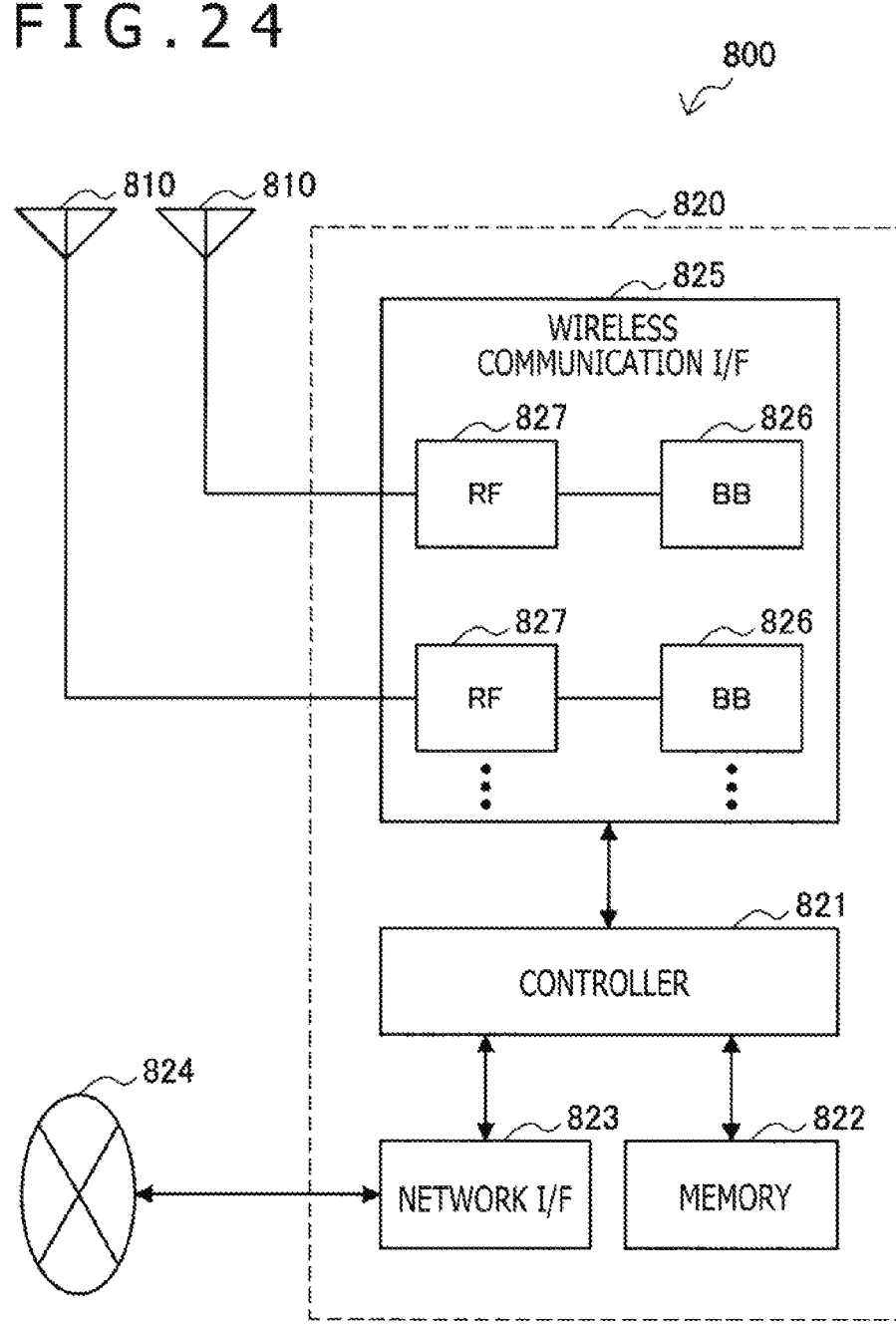
FIG. 24 is a block diagram illustrating a first example of the schematic configuration of an eNB to which the technology according to the present disclosure may be applied.

FIG. 24 is a block diagram illustrating a first example of the schematic configuration of an eNB to which the technology according to the present disclosure may be applied. An eNB 800 includes one or more antennas 810 and a base station apparatus 820. The antennas 810 may each be connected to the base station apparatus 820 through an RF cable.

The antennas 810 each include one or a plurality of antenna elements (for example, a plurality of antenna elements of a MIMO antenna), and are used when the base station apparatus 820 transmits or receives wireless signals. The eNB 800 may include the plurality of antennas 810, as illustrated in FIG. 24. The plurality of antennas 810 may be compatible with a plurality of frequency bands used by the eNB 800, for example. Note that, although FIG. 24 illustrates the example in which the eNB 800 includes the plurality of antennas 810, the eNB 800 may only include one antenna 810.

The base station apparatus 820 includes a controller 821, a memory 822, a network interface 823, and a wireless communication interface 825.

The controller 821 may be, for example, a CPU or a DSP, and operates various functions of a higher layer of the base station apparatus 820. For example, the controller 821 generates a data packet from data in signals processed by the wireless communication interface 825, and transfers the generated packet via the network interface 823. The controller 821 may bundle data from a plurality of baseband processors to generate a bundled packet, and transfer the generated bundled packet. Further, the controller 821 may have a logical function of executing control such as radio resource control, radio bearer control, mobility management, admission control, or scheduling. Further, the controller 821 may execute the control in question in corporation with a neighboring eNB or a core network node. The memory 822 includes a RAM and a ROM, and stores a program that is executed by the controller 821, and various types of control data (for example, terminal list, transmission electric power data, and scheduling data).

The network interface 823 is a communication interface for connecting the base station apparatus 820 to a core network 824. The controller 821 may communicate with a core network node or another eNB via the network interface 823. In this case, the eNB 800 may be connected to a core network node or another eNB through a logical interface (for example, S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, to thereby execute various types of signal processing of layers (for example, L1, MAC (Medium Access Control), RLC (Radio Link Control), and PDCP (Packet Data Convergence Protocol)). The BB processor 826 may have a part or all of the above-mentioned logical functions instead of the controller 821. The BB processor 826 may be a memory configured to store a communication control program, or a module including a processor configured to execute the program in question and related circuits. The functions of the BB processor 826 may be changed through updating of the program. Further, the module may be a card or blade that is inserted into a slot of the base station apparatus 820. Alternatively, the module may be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the plurality of BB processors 826, as illustrated in FIG. 24. The plurality of BB processors 826 may be compatible with a plurality of frequency bands used by the eNB 800, for example. Further, the wireless communication interface 825 may include the plurality of RF circuits 827, as illustrated in FIG. 24. The plurality of RF circuits 827 may correspond to a plurality of antenna elements, for example. Note that, although FIG. 24 illustrates the example in which the wireless communication interface 825 includes the plurality of BB processors 826 and the plurality of RF circuits 827, the number of the BB processors 826 or RF circuits 827 of the wireless communication interface 825 may be one.

In the eNB 800 illustrated in FIG. 24, one or more components in the base station 100 (for example, processing unit 150), which are described with reference to FIG. 12, may be implemented by the wireless communication interface 825. Alternatively, at least some of these components may be implemented by the controller 821. As an example, the eNB 800 may have mounted thereon a module including a part of the wireless communication interface 825 (for example, BB processor 826) or all components thereof, and/or the controller 821, and the one or more components may be implemented by the module in question. In this case, the module may store a program for causing the processor to function as the one or more components (in other words, a program for causing the processor to execute operations of the one or more components), to thereby execute the program in question. As another example, the eNB 800 may have installed thereon the program for causing the processor to function as the one or more components, and the wireless communication interface 825 (for example, BB processor 826) and/or the controller 821 may execute the program in question. As described above, the eNB 800, the base station apparatus 820, or the module may be provided as an apparatus including the one or more components, and the program for causing the processor to function as the one or more components may be provided. A readable recording medium having recorded thereon the program may also be provided.

Further, in the eNB 800 illustrated in FIG. 24, the wireless communication unit 120 described with reference to FIG. 12 may be implemented by the wireless communication interface 825 (for example, RF circuit 827). Further, the antenna unit 110 may be implemented by the antenna 810. Further, an interface between the processing unit 240 and an upper node or another base station apparatus may be implemented by the controller 821 and/or the network interface 823.

Second Application Example

Figure 25:
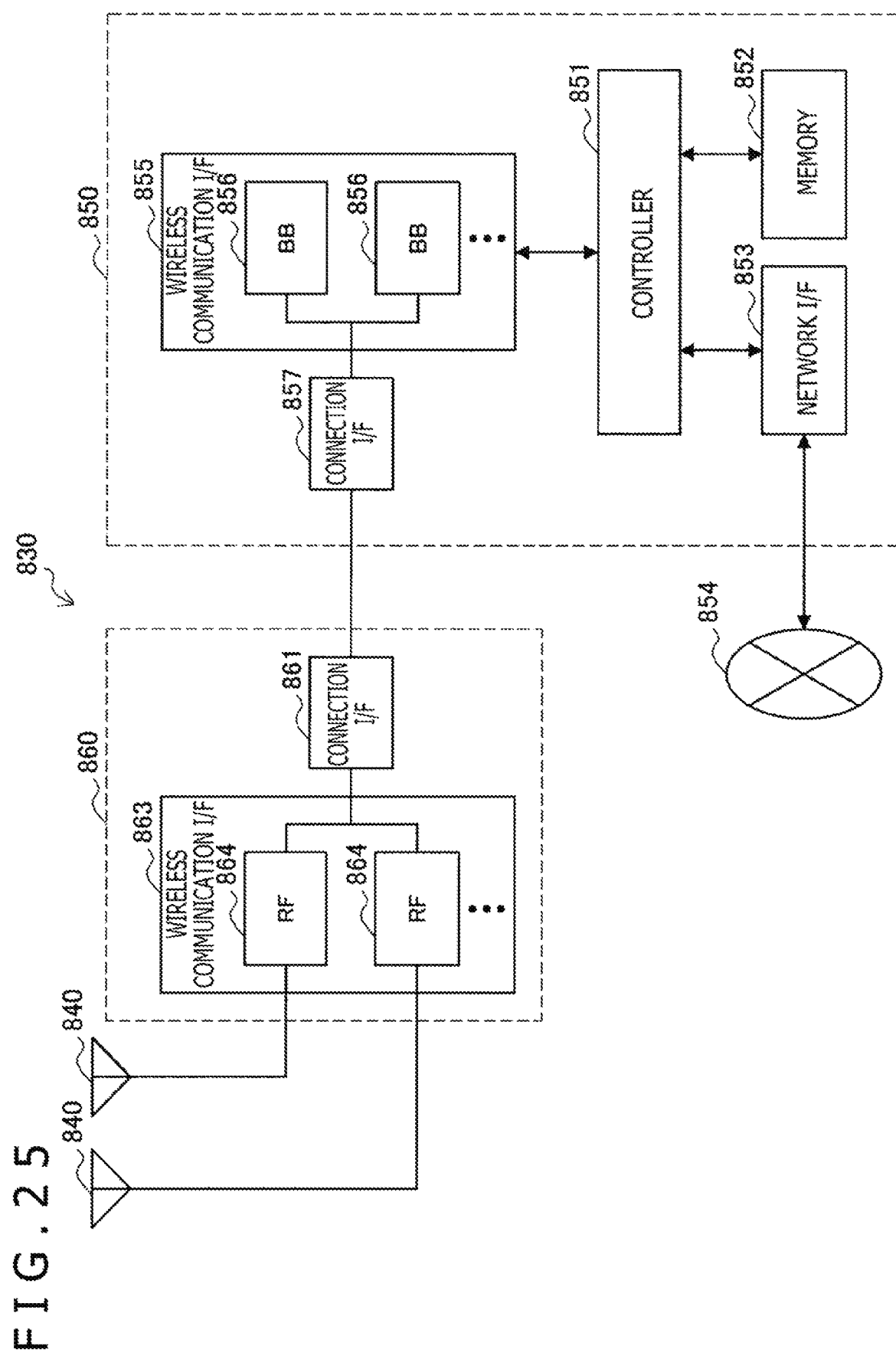
FIG. 25 is a block diagram illustrating a second example of the schematic configuration of the eNB to which the technology according to the present disclosure may be applied.

FIG. 25 is a block diagram illustrating a second example of the schematic configuration of an eNB to which the technology according to the present disclosure may be applied. An eNB 830 includes one or more antennas 840, a base station apparatus 850, and an RRH 860. The antennas 840 may each be connected to the RRH 860 through an RF cable. Further, the base station apparatus 850 and the RRH 860 may be connected to each other through a high-speed line such as an optical fiber cable.

The antennas 840 each include one or a plurality of antenna elements (for example, a plurality of antenna elements of a MIMO antenna), and are used when the RRH 860 transmits or receives wireless signals. The eNB 830 may include the plurality of antennas 840, as illustrated in FIG. 25. The plurality of antennas 840 may be compatible with a plurality of frequency bands used by the eNB 830, for example. Note that, although FIG. 25 illustrates the example in which the eNB 830 includes the plurality of antennas 840, the eNB 830 may include one antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 24.

The wireless communication interface 855 supports any cellular communication scheme such as LTE or LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is similar to the BB processor 826 described with reference to FIG. 24, except that the BB processor 856 is connected to the RF circuit 864 of the RRH 860 via the connection interface 857. The wireless communication interface 855 may include the plurality of BB processors 856, as illustrated in FIG. 25. The plurality of BB processors 856 may be compatible with a plurality of frequency bands used by the eNB 830, for example. Note that, although FIG. 25 illustrates the example in which the wireless communication interface 855 includes the plurality of BB processors 856, the wireless communication interface 855 may only include one BB processor 856.

The connection interface 857 is an interface for connecting the base station apparatus 850 (wireless communication interface 855) to the RRH 860. The connection interface 857 may also be a communication module for communication in the high-speed line that connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may also be a communication module for communication in the high-speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include the plurality of RF circuits 864, as illustrated in FIG. 25. The plurality of RF circuits 864 may correspond to a plurality of antenna elements, for example. Note that, although FIG. 25 illustrates the example in which the wireless communication interface 863 includes the plurality of RF circuits 864, the wireless communication interface 863 may include one RF circuit 864.

In the eNB 830 illustrated in FIG. 25, one or more components in the base station 100 (for example, processing unit 150), which are described with reference to FIG. 12, may be implemented by the wireless communication interface 855 and/or the wireless communication interface 863. Alternatively, at least some of these components may be implemented by the controller 851. As an example, the eNB 830 may have mounted thereon a module including a part of the wireless communication interface 855 (for example, BB processor 856) or all components thereof, and/or the controller 851, and the one or more components may be implemented by the module in question. In this case, the module may store a program for causing the processor to function as the one or more components (in other words, a program for causing the processor to execute operations of the one or more components), to thereby execute the program in question. As another example, the eNB 830 may have installed thereon the program for causing the processor to function as the one or more components, and the wireless communication interface 855 (for example, BB processor 856) and/or the controller 851 may execute the program in question. As described above, the eNB 830, the base station apparatus 850, or the module may be provided as an apparatus including the one or more components, and the program for causing the processor to function as the one or more components may be provided. A readable recording medium having recorded thereon the program may also be provided.

Further, in the eNB 830 illustrated in FIG. 25, the wireless communication unit 120 described with reference to FIG. 12 may be implemented by the wireless communication interface 825 (for example, RF circuit 827). Further, the antenna unit 110 may be implemented by the antenna 810. Further, an interface between the processing unit 240 and an upper node or another base station apparatus may be implemented by the controller 821 and/or the network interface 823.

Application Example of Terminal Apparatus

First Application Example

Figure 26:
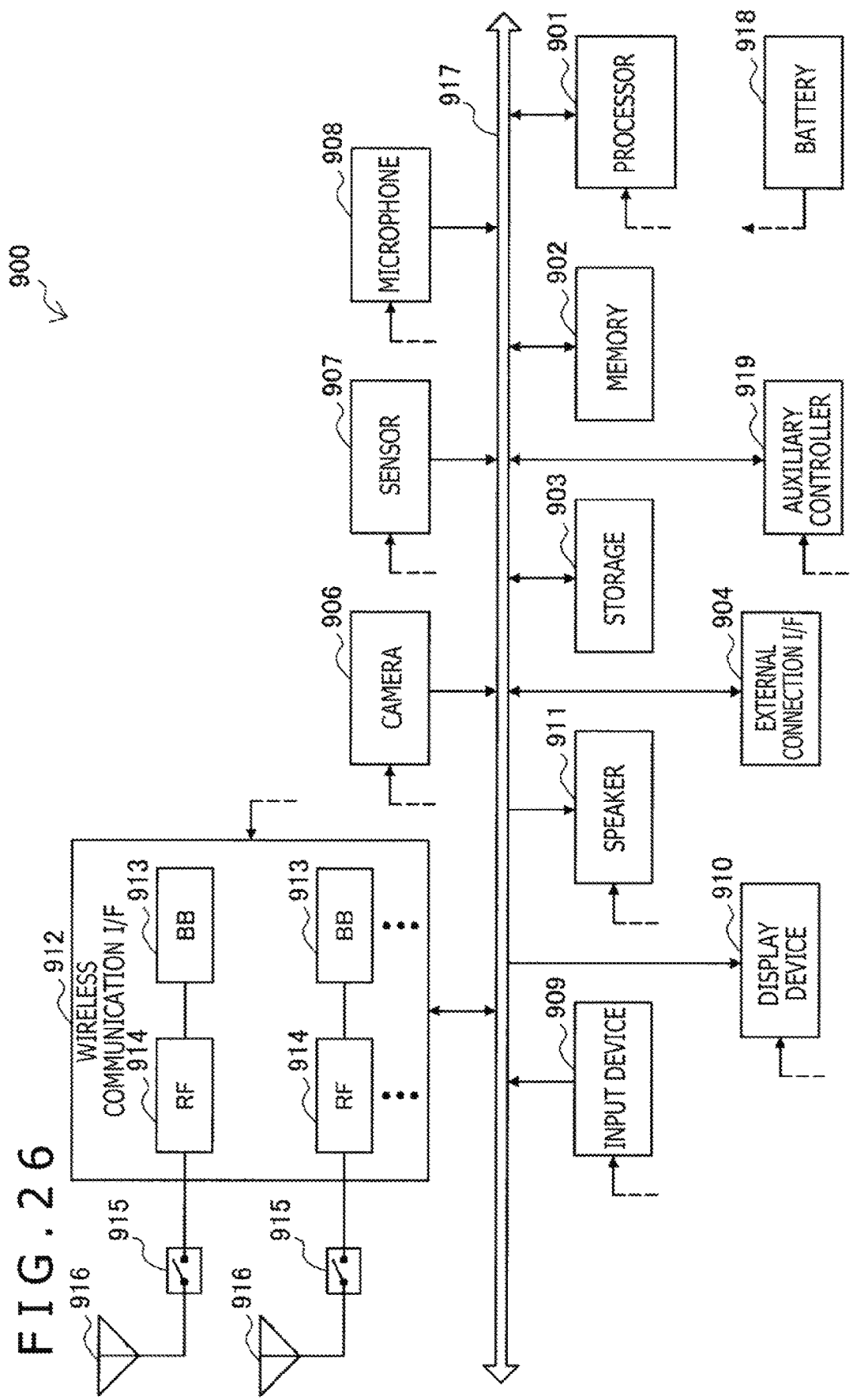
FIG. 26 is a block diagram illustrating an example of the schematic configuration of a smartphone 900 to which the technology according to the present disclosure may be applied.

FIG. 26 is a block diagram illustrating an example of the schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a SoC (System on Chip), and controls functions of an application layer and another layer of the smartphone 900. The memory 902 includes a RAM and a ROM, and stores a program that is executed by the processor 901, and data. The storage 903 may include a storage medium such as a semiconductor memory or a hard disk. The external connection interface 904 is an interface for connecting an external device such as a memory card or a USB (Universal Serial Bus) device to the smartphone 900.

The camera 906 includes an image sensor such as a CCD (Charge Coupled Device) or a CMOS (Complementary Metal Oxide Semiconductor), and generates a captured image. The sensor 907 may include a group of sensors such as a measurement sensor, a gyro sensor, a geomagnetic sensor, and an acceleration sensor. The microphone 908 converts sound that is input to the smartphone 900 to audio signals. The input device 909 includes, for example, a touch sensor configured to detect touch onto a screen of the display device 910, a keypad, a keyboard, a button, or a switch, and receives an operation or information input from a user. The display device 910 includes a screen such as a liquid crystal display (LCD) or an organic light-emitting diode (OLED) display, and displays an output image of the smartphone 900. The speaker 911 converts audio signals that are output from the smartphone 900 to sound.

The wireless communication interface 912 supports any cellular communication scheme such as LTE or LTE-Advanced, and executes wireless communication. The wireless communication interface 912 may typically include, for example, a BB processor 913 and an RF circuit 914. The BB processor 913 may perform, for example, encoding/decoding, modulating/demodulating, and multiplexing/demultiplexing, to thereby execute various types of signal processing for wireless communication. Meanwhile, the RF circuit 914 may include, for example, a mixer, a filter, and an amplifier, and transmits and receives wireless signals via the antenna 916. The wireless communication interface 912 may also be a single chip module having the BB processor 913 and the RF circuit 914 integrated thereon. The wireless communication interface 912 may include the plurality of BB processors 913 and the plurality of RF circuits 914, as illustrated in FIG. 26. Note that, although FIG. 26 illustrates the example in which the wireless communication interface 912 includes the plurality of BB processors 913 and the plurality of RF circuits 914, the number of the BB processors 913 or RF circuits 914 of the wireless communication interface 912 may be one.

Furthermore, in addition to a cellular communication scheme, the wireless communication interface 912 may support other types of wireless communication schemes such as a short-distance wireless communication scheme, a near field communication scheme, and a wireless LAN (Local Area Network) scheme. In that case, the wireless communication interface 912 may include the BB processor 913 and the RF circuit 914 for each wireless communication scheme.

The antenna switches 915 each switch a connection destination of the corresponding antenna 916 among a plurality of circuits (for example, circuits for different wireless communication schemes) in the wireless communication interface 912.

The antennas 916 each include one or a plurality of antenna elements (for example, a plurality of antenna elements of a MIMO antenna), and are used when wireless signals are transmitted or received via the wireless communication interface 912. The smartphone 900 may include the plurality of antennas 916, as illustrated in FIG. 26. Note that, although FIG. 26 illustrates the example in which the smartphone 900 includes the plurality of antennas 916, the smartphone 900 may include one antenna 916.

In addition, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 26 via feeder lines, which are partially illustrated as dashed lines in FIG. 26. The auxiliary controller 919 operates the minimum necessary function of the smartphone 900 in a sleep mode, for example.

In the smartphone 900 illustrated in FIG. 26, one or more components in the terminal apparatus 200 (for example, processing unit 240), which are described with reference to FIG. 13, may be implemented by the wireless communication interface 912. Alternatively, at least some of these components may be implemented by the processor 901 or the auxiliary controller 919. As an example, the smartphone 900 may have mounted thereon a module including a part of the wireless communication interface 912 (for example, BB processor 913) or all components thereof, the processor 901, and/or the auxiliary controller 919, and the one or more components may be implemented by the module in question. In this case, the module may store a program for causing the processor to function as the one or more components (in other words, a program for causing the processor to execute operations of the one or more components), to thereby execute the program in question. As another example, the smartphone 900 may have installed thereon the program for causing the processor to function as the one or more components, and the wireless communication interface 912 (for example, BB processor 913), the processor 901, and/or the auxiliary controller 919 may execute the program in question. As described above, the smartphone 900 or the module may be provided as an apparatus including the one or more components, and the program for causing the processor to function as the one or more components may be provided. A readable recording medium having recorded thereon the program may also be provided.

Further, in the smartphone 900 illustrated in FIG. 26, for example, the wireless communication unit 220 described with reference to FIG. 13 may be implemented by the wireless communication interface 912 (for example, RF circuit 914). Further, the antenna unit 210 may be implemented by the antenna 916.

Second Application Example

Figure 27:
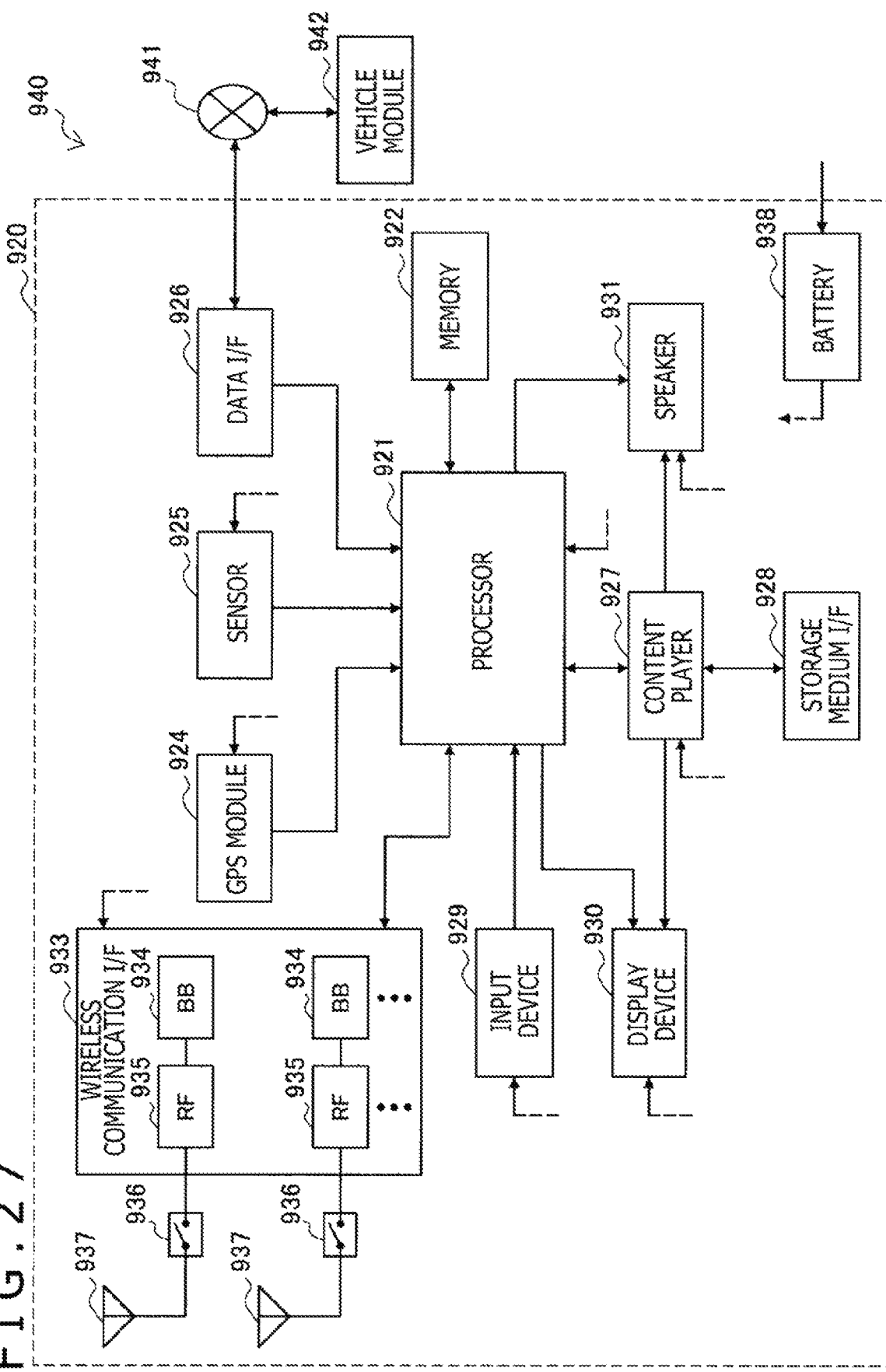
FIG. 27 is a block diagram illustrating an example of the schematic configuration of a car navigation apparatus 920 to which the technology according to the present disclosure may be applied.

FIG. 27 is a block diagram illustrating an example of the schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation apparatus 920. The memory 922 includes a RAM and a ROM, and stores a program that is executed by the processor 921, and data.

The GPS module 924 uses GPS signals received from GPS satellites to measure a position (for example, latitude, longitude, and altitude) of the car navigation apparatus 920. The sensor 925 may include a group of sensors such as a gyro sensor, a geomagnetic sensor, and a barometric sensor. The data interface 926 is connected to an in-vehicle network 941 via a terminal that is not illustrated, for example, and acquires data generated by a vehicle, such as vehicle speed data.

The content player 927 reproduces content stored in a storage medium (for example, CD or DVD) that is inserted into the storage medium interface 928. The input device 929 includes, for example, a touch sensor configured to detect touch onto a screen of the display device 930, a button, or a switch, and receives an operation or information input from a user. The display device 930 includes a screen such as an LCD or an OLED display, and displays an image of the navigation function or content that is reproduced. The speaker 931 outputs sound of the navigation function or the content that is reproduced.

The wireless communication interface 933 supports any cellular communication scheme such as LTE or LTE-Advanced, and executes wireless communication. The wireless communication interface 933 may typically include, for example, a BB processor 934 and an RF circuit 935. The BB processor 934 may perform, for example, encoding/decoding, modulating/demodulating, and multiplexing/demultiplexing, to thereby execute various types of signal processing for wireless communication. Meanwhile, the RF circuit 935 may include, for example, a mixer, a filter, and an amplifier, and transmits and receives wireless signals via the antenna 937. The wireless communication interface 933 may be a single chip module having the BB processor 934 and the RF circuit 935 integrated thereon. The wireless communication interface 933 may include the plurality of BB processors 934 and the plurality of RF circuits 935, as illustrated in FIG. 27. Note that, although FIG. 27 illustrates the example in which the wireless communication interface 933 includes the plurality of BB processors 934 and the plurality of RF circuits 935, the number of the BB processors 934 or RF circuits 935 of the wireless communication interface 933 may be one.

Furthermore, in addition to a cellular communication scheme, the wireless communication interface 933 may support other types of wireless communication schemes such as a short-distance wireless communication scheme, a near field communication scheme, and a wireless LAN scheme. In that case, the wireless communication interface 933 may include the BB processor 934 and the RF circuit 935 for each wireless communication scheme.

The antenna switches 936 each switch a connection destination of the corresponding antenna 937 among plural circuits (for example, circuits for different wireless communication schemes) in the wireless communication interface 933.

The antennas 937 each include one or a plurality of antenna elements (for example, a plurality of antenna elements of a MIMO antenna), and are used when wireless signals are transmitted or received via the wireless communication interface 933. The car navigation apparatus 920 may include the plurality of antennas 937, as illustrated in FIG. 27. Note that, although FIG. 27 illustrates the example in which the car navigation apparatus 920 includes the plurality of antennas 937, the car navigation apparatus 920 may include one antenna 937.

In addition, the car navigation apparatus 920 may include the antenna 937 for each wireless communication scheme. In that case, the antenna switches 936 may be omitted from the configuration of the car navigation apparatus 920.

The battery 938 supplies electric power to each block of the car navigation apparatus 920 illustrated in FIG. 27 via feeder lines that are partially illustrated as dashed lines in FIG. 27. Further, the battery 938 accumulates electric power supplied from the vehicle.

In the car navigation apparatus 920 illustrated in FIG. 27, one or more components in the terminal apparatus 200 (for example, processing unit 240), which are described with reference to FIG. 13, may be implemented by the wireless communication interface 933. Alternatively, at least some of these components may be implemented by the processor 921. As an example, the car navigation apparatus 920 may have mounted thereon a module including a part of the wireless communication interface 933 (for example, BB processor 934) or all components thereof, and/or the processor 921, and the one or more components may be implemented by the module in question. In this case, the module may store a program for causing the processor to function as the one or more components (in other words, a program for causing the processor to execute operations of the one or more components), to thereby execute the program in question. As another example, the car navigation apparatus 920 may have installed thereon the program for causing the processor to function as the one or more components, and the wireless communication interface 933 (for example, BB processor 934) and/or the processor 921 may execute the program in question. As described above, the car navigation apparatus 920 or the module may be provided as an apparatus including the one or more components, and the program for causing the processor to function as the one or more components may be provided. A readable recording medium having recorded thereon the program may also be provided.

Further, in the car navigation apparatus 920 illustrated in FIG. 27, for example, the wireless communication unit 220 described with reference to FIG. 13 may be implemented by the wireless communication interface 912 (for example, RF circuit 914). Further, the antenna unit 210 may be implemented by the antenna 916.

Further, the technology according to the present disclosure may also be realized as an in-vehicle system (or vehicle) 940 including the one or more blocks of the car navigation apparatus 920, the in-vehicle network 941, and a vehicle module 942. The vehicle module 942 generates vehicle data such as vehicle speed, engine speed, or trouble information, and outputs the generated data to the in-vehicle network 941.

Note that, the eNBs in the above description may each be a gNB (gNodeB or next generation Node B).

3. CONCLUSION

As described above, according to the embodiment of the present disclosure, there can be provided the terminal apparatus 200 configured to select, on the basis of a predetermined requirement, a procedure to be executed in a case where plural procedures conflict with each other in a frequency or time domain or a case where an electric power resource is insufficient for execution of the plural procedures.

The respective steps of the processing that is executed by each apparatus described herein are not necessarily performed in chronological order in the order illustrated in the sequence diagrams or the flowcharts. For example, the respective steps of the processing that is executed by each apparatus may be performed in an order different from the order illustrated in the flowcharts or performed in parallel to each other.

Further, a computer program for causing hardware incorporated in each apparatus, such as a CPU, a ROM, and a RAM, to demonstrate the functions equivalent to the configurations of the apparatus can be created. Further, a storage medium having the computer program stored thereon can be provided. Further, with the respective functional blocks in the functional block diagrams achieved by hardware, a series of processes can be implemented by the hardware.

The preferred embodiment of the present disclosure is described in detail so far with reference to the attached drawings, but the technical scope of the present disclosure is not limited to the example. It is apparent that various changes or modifications could be arrived at by persons who have ordinary knowledge in the technical field to which the present disclosure belongs within the scope of the technical ideas described in the appended claims, and it is therefore understood that such changes or modifications naturally belong to the technical scope of the present disclosure.

Further, the effects described herein are merely illustrative or exemplary and are not limited. That is, the technology according to the present disclosure may provide other effects that are obvious for persons skilled in the art from the description of the present specification, in addition to the above-mentioned effects or instead of the above-mentioned effects.

Note that the following configurations also belong to the technical scope of the present disclosure.

(1) A communication apparatus including:
a control unit configured to select, based on a predetermined requirement, a signal to be transmitted in a case where transmission of user data, transmission of a first reference signal for channel status acquisition, and transmission of a second reference signal for suitable beam selection from beams emitted by a base station conflict with each other.

(2) The communication apparatus according to Item (1), in which the control unit selects the signal to be transmitted based on the predetermined requirement in a case where a transmission area of the user data, a transmission area of the first reference signal, and a transmission area of the second reference signal conflict with each other.

(3) The communication apparatus according to Item (2), in which the control unit selects the signal to be transmitted based on the predetermined requirement that is a requirement for traffic.

(4) The communication apparatus according to Item (3), in which the control unit selects the signal to be transmitted based on the requirement for traffic that is a condition prioritizing the transmission of the user data.

(5) The communication apparatus according to Item (3), in which the control unit selects the signal to be transmitted based on the requirement for traffic that is a condition prioritizing the channel status acquisition.

(6) The communication apparatus according to Item (3), in which the control unit selects the signal to be transmitted based on the requirement for traffic that is a condition prioritizing the suitable beam selection.

(7) The communication apparatus according to any one of Items (2) to (6), in which the control unit selects the signal to be transmitted based on the predetermined requirement in a case where the transmission areas conflict with each other in a frequency domain.

(8) The communication apparatus according to any one of Items (2) to (6), in which the control unit selects the signal to be transmitted based on the predetermined requirement in a case where the transmission areas conflict with each other in a time domain.

(9) The communication apparatus according to Item (1), in which the control unit selects the signal to be transmitted based on the predetermined requirement in a case where the transmission of the user data, the transmission of the first reference signal, and the transmission of the second reference signal conflict with each other in terms of electric power.

(10) The communication apparatus according to Item (9), in which the control unit reduces at least any one of electric power required for the transmission of the user data, electric power required for the transmission of the first reference signal, and electric power required for the transmission of the second reference signal in a case where the transmission of the user data, the transmission of the first reference signal, and the transmission of the second reference signal conflict with each other in terms of electric power.

(11) The communication apparatus according to Item (10), in which the control unit reduces required electric power in a case where a plurality of component carriers is used.

(12) The communication apparatus according to Item (10) or (11), in which the control unit reduces required electric power by stopping the transmission of the user data.

(13) The communication apparatus according to Item (10) or (11), in which the control unit reduces required electric power by reducing the number of slots that are used in the channel status acquisition.

(14) The communication apparatus according to Item (10) or (11), in which the control unit reduces required electric power by reducing a frequency band that is used in the channel status acquisition.

(15) The communication apparatus according to Item (10) or (11), in which the control unit reduces required electric power by reducing the number of beams that are used in a optimal beam selection.

(16) A communication control method including:
selecting, by a processor, based on a predetermined requirement, a signal to be transmitted in a case where transmission of user data, transmission of a first reference signal for channel status acquisition, and transmission of a second reference signal for suitable beam selection from beams emitted by a base station conflict with each other.

(17) A computer program for causing a computer to execute:
selecting, based on a predetermined requirement, a signal to be transmitted in a case where transmission of user data, transmission of a first reference signal for channel status acquisition, and transmission of a second reference signal for suitable beam selection from beams emitted by a base station conflict with each other.

REFERENCE SIGNS LIST

100 Base station
200 Terminal apparatus

The invention claimed is:

1. A communication apparatus comprising:
a transmitter; and
a controller containing circuitry configured to:
based on a predetermined condition, determine a condition exists, the condition being one of a predetermined set of conditions that include:
1) a conflict in frequency or tune between two or more of
a transmission of user data,
a transmission of a first reference signal for channel status acquisition, or
a transmission of a second reference signal for beam selection, by the communication apparatus, from beams emitted by a base station,
2) an electric power capability of the transmitter is insufficient to simultaneously transmit two or more of
the user data,
the first reference signal, or
the second reference signal, and
3) beam tracking is required for stable communications, and
wirelessly transmit a signal related to the determined condition via the transmitter.

2. The communication apparatus according to claim 1, wherein the conflict in frequency or time comprises a conflict in a transmission area.

3. The communication apparatus according to claim 2, wherein the predetermined requirement is a traffic requirement.

4. The communication apparatus according to claim 3, wherein traffic requirement is a condition prioritizing the transmission of the user data.

5. The communication apparatus according to claim 3, wherein the traffic requirement is a condition prioritizing the channel status acquisition.

6. The communication apparatus according to claim 3, wherein the traffic requirement is a condition prioritizing the beam selection.

7. The communication apparatus according to claim 2, wherein the conflict in frequency or time comprises a conflict in a frequency domain.

8. The communication apparatus according to claim 2, wherein the conflict in frequency or time comprises a conflict in a time domain.

9. The communication apparatus according to claim 1, wherein the determined condition is that the electric power capability of the transmitter is insufficient to simultaneously transmit two or more of:
the transmission of the user data,
the transmission of the first reference signal, or
the transmission of the second reference signal.

10. The communication apparatus according to claim 9, wherein the controller is configured to reduce at least one of electric power required for the transmission of the user data, electric power required for the transmission of the first reference signal, or electric power required for the transmission of the second reference signal.

11. The communication apparatus according to claim 10, wherein the controller is configured to reduce required electric power in a case where a plurality of component carriers is used.

12. The communication apparatus according to claim 10, wherein the controller is configured to reduce required electric power by stopping the transmission of the user data.

13. The communication apparatus according to claim 10, wherein the controller is configured to reduce required electric power by reducing a number of slots that are used in the channel status acquisition.

14. The communication apparatus according to claim 10, wherein the controller is configured to reduce required electric power by reducing a frequency band that is used in the channel status acquisition.

15. The communication apparatus according to claim 10, wherein the controller is configured to reduce required electric power by reducing a number of beams that are used in an optimal beam selection.

16. The communication apparatus of claim 1, wherein the signal related to the determined condition includes:
a selected specific one of the user data, the first reference signal or the second reference signal; and
an indicator corresponding to the selected specific one of the user data, the first reference signal or the second reference signal.

17. A communication control method performed by a wireless communication apparatus, the method comprising:
based on a predetermined condition, determining a condition exists, the condition being one of a predetermined set of conditions that include:
1) a conflict in frequency or time between wireless transmissions by the wireless communication apparatus of two or more of
user data,
a first reference signal for channel status acquisition, or
a second reference signal for beam selection, by the wireless communication apparatus, from beams emitted by a base station,
2) an electric power capability of the wireless communication apparatus is insufficient to simultaneously transmit two or more of
the user data,
the first reference signal, or
the second reference signal, and
3) beam tracking is required for stable communications, and
wirelessly transmitting a signal related to the determined condition.

18. The method of claim 17, wherein the signal related to the determined condition includes:
a selected specific one of the user data, the first reference signal or the second reference signal; and
an indicator corresponding to the selected specific one of the user data, the first reference signal or the second reference signal.

19. A non-transitory computer readable medium containing instructions that when executed by a computer cause the computer to perform a method, the method comprising:
based on a predetermined condition, determining a condition exists, the condition being one of a predetermined set of conditions that include:
1) a conflict in frequency or time between transmissions of the computer of two or more of
user data,
a first reference signal for channel status acquisition, or
a second reference signal for beam selection, by the communication apparatus, from beams emitted by a base station,
2) an electric power capability of the computer is insufficient to simultaneously transmit two or more of
the user data,
the first reference signal, or
the second reference signal, and
3) beam tracking is required for stable communications, and
wirelessly transmitting a signal related to the determined condition.

20. The non-transitory computer readable medium of claim 19, wherein the signal related to the determined condition includes:
a selected specific one of the user data, the first reference signal or the second reference signal; and
an indicator corresponding to the selected specific one of the user data, the first reference signal or the second reference signal.

* * * * *